United States Patent [19]
Lyden et al.

[11] Patent Number: 5,709,954
[45] Date of Patent: Jan. 20, 1998

[54] CHEMICAL BONDING OF RUBBER TO PLASTIC IN ARTICLES OF FOOTWEAR

[75] Inventors: Robert M. Lyden, Beaverton; Ross A. McLaughlin, Lake Oswego; Henry T. Chriss; Calvin M. Buck, IV, both of Beaverton; Daniel R. Potter, Tigard; Steven M. Vincent, Beaverton, all of Oreg.

[73] Assignees: Nike, Inc.; Nike International Ltd., both of Beaverton, Oreg.

[21] Appl. No.: 441,698

[22] Filed: May 15, 1995

Related U.S. Application Data

[62] Division of Ser. No. 986,046, Dec. 10, 1992, abandoned.

[51] Int. Cl.$^6$ ..................................................... A43B 5/00
[52] U.S. Cl. .................. 428/500; 428/492; 36/114; 36/31; 36/59 R; 36/128; 36/14; 12/146 BR; 12/146 B; 12/142 R; 12/142 RJ
[58] Field of Search ................... 428/34.1, 500, 428/492; 36/114, 31, 59 R, 128, 14; 12/146 BR, 146 B, 142 R, 142 RJ

[56] References Cited

U.S. PATENT DOCUMENTS

| | | | |
|---|---|---|---|
| 2,023,346 | 12/1935 | Temple | 361/224 |
| 4,342,158 | 8/1982 | McMahan et al. | 36/35 R |
| 4,348,003 | 9/1982 | Beneteau | 249/96 |
| 4,366,630 | 1/1983 | Bloom | 36/30 R |
| 4,676,010 | 6/1987 | Cheskin | 36/32 R |
| 4,694,591 | 9/1987 | Barich et al. | 36/102 |
| 4,732,428 | 3/1988 | Mizoshiro et al. | 524/585 |
| 4,996,263 | 2/1991 | Pyke et al. | 525/78 |
| 5,068,277 | 11/1991 | Vukor et al. | 524/441 |
| 5,077,916 | 1/1992 | Beneteau | 36/31 |
| 5,258,222 | 11/1993 | Crivielli | 428/323 |

*Primary Examiner*—Charles Nold
*Attorney, Agent, or Firm*—Banner & Witcoff, Ltd.

[57] ABSTRACT

An article of footwear comprising relatively elastic and relatively inelastic materials chemically bonded together is disclosed. In one embodiment, the relatively elastic and relatively inelastic materials are arranged in such a fashion to impart flexibility to the article of footwear. In particular, plastic and rubber materials are bonded together to improve the flexibility of an outsole of an article of footwear. The invention also is directed to the fabrication of new or improved devices and elements for use in articles of footwear and their associated methods of construction such as closure mechanisms comprising relatively elastic straps bonded to relatively inelastic anchor portions and vice versa, articulating inelastic and elastic exoskeleton constructions useful in skates and ski boots, and elastic or inelastic eyelets surrounded by inelastic or elastic materials. The invention also is directed to chemically bonding relatively elastic to relatively inelastic materials for contemplated use in protective athletic equipment such as helmets and protective padding, and for use in prosthetic devices.

20 Claims, 23 Drawing Sheets

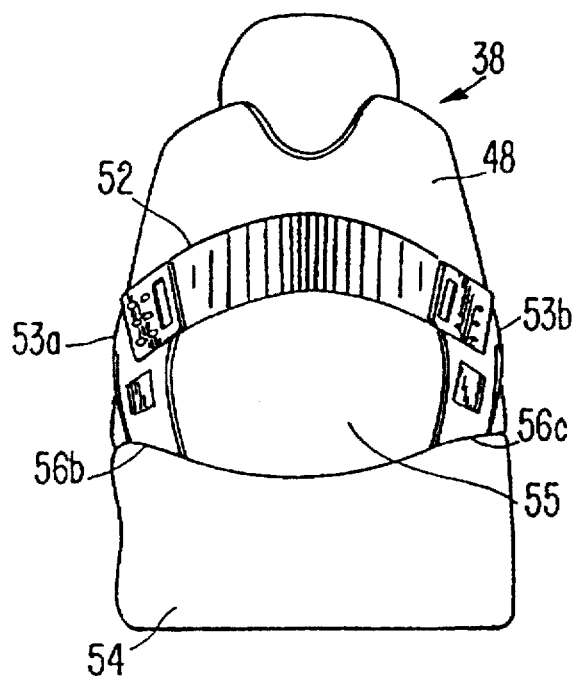# 
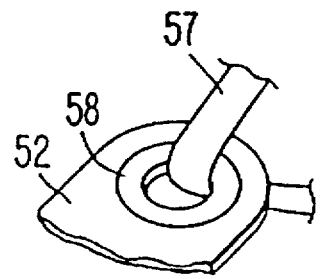
FIG. 20a
FIG. 21
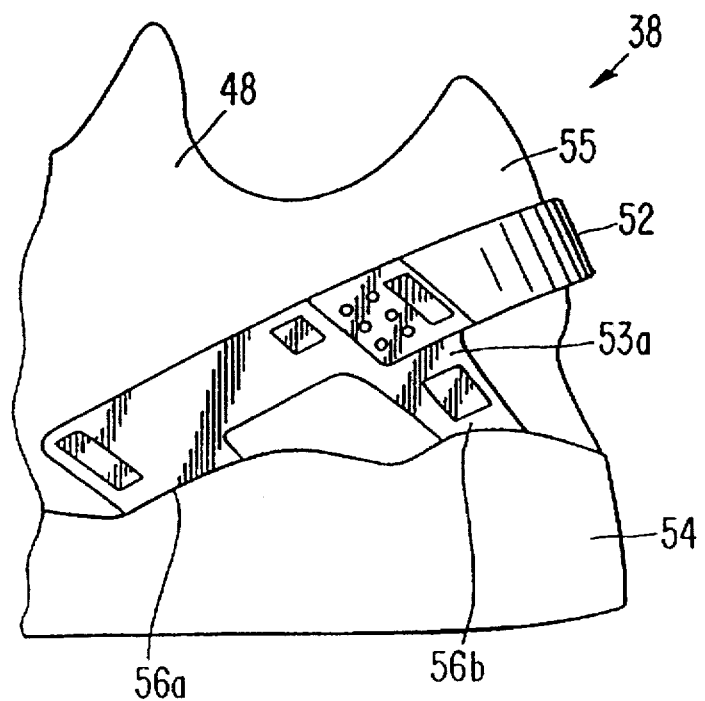
FIG. 20b

CHEMICAL BONDING OF RUBBER TO PLASTIC IN ARTICLES OF FOOTWEAR

RELATED APPLICATION

This application is a divisional application of U.S. application Ser. No. 07/986,046, filed on Dec. 10, 1992, abandoned.

BACKGROUND OF THE INVENTION

1. Field of the Invention

The invention relates to the formation of a chemical bond between relatively elastic and relatively inelastic materials, for example, between rubber and plastic materials. In particular, the invention relates to an outsole of an article of footwear and methods of making the outsole wherein the outsole comprises both relatively elastic and relatively inelastic materials which are chemically bonded together.

2. Prior Art

Elastic and inelastic materials have been used in the construction of articles of footwear for many years. Particularly, rubber materials have been widely used in the fabrication of midsoles and outsoles of articles of footwear. Rubber and plastic elements frequently are placed in direct communication with one another in the fabrication of an article of footwear with conventional fixation methods including stitching, riveting, screwing, nailing, and the use of various adhesives.

The use of adhesives has numerous disadvantages. Adhesives often are volatile and harmful to the environment both in the emission to the atmosphere of noxious gases and in the emission to the surrounding environment of the adhesives and their by-products. Adhesives also typically do not form a favorable bond between the rubber and plastic and hence, the materials are prone to rip and tear when the adhesive bond fails.

The use of adhesives also often requires the labor intensive steps of roughing at least one of the material surfaces to be joined, applying primer and adhesive, fitting the components, and applying both heat and pressure in order to activate the cement system and form a mechanical bond between the adjoining rubber and plastic materials. This process is time consuming, labor intensive, expensive, and presents numerous opportunities for human, material, or environment variables to adversely influence the quality of the mechanical bonds and associated products. The adhesive bond formed is prone to delamination of plastic and rubber as the result of bond failure induced by fatigue and environmental degradation.

Direct injection of plastic and rubber to one another, to leather, and to many of the natural and synthetic textiles commonly used in the manufacture of articles of footwear also is known. See U.S. Pat. No. 4,481,727 to Stubblefield (double pour mold or double density injection process). Direct injection also has its disadvantages in that it commonly employs heat, pressure, various primers, and the technique of impregnating textiles with the plastic and/or the rubber material in order to enhance the quality of what is nevertheless substantially a mechanical bond formed between the elements. The mechanical bond formed by direct injection also is prone to delamination of plastic and rubber as the result of bond failure induced by fatigue and environmental degradation.

The formation of a chemical (covalent) bond between specific rubber and plastic articles is known and described in U.S. Pat. Nos. 4,816,345 and 4,921,762 to Jadamus et al.

U.S. Pat. No. 4,816,345 discloses the bonding of a molded piece of a polyphenylene ether-containing polymer and a molded piece of an elastomeric thermoplastic block copolymer of the type A-B-A, wherein A represents a styrene block and B represents a soft phase block, for example a block of polymerized conjugated diene which may or may not have been selectively hydrogenated. The bonding is achieved by heating of the two pieces while contacting each other. The bonding mechanism is not known, but is distinguished from vulcanization. U.S. Pat. No. 4,921,762 disclose a process for bonding a thermoplastic polyphenylene-ether-containing polymer and a rubber (EPDM and/or styrene-butadiene rubber) by covulcanization, wherein the rubber portion contains peroxidic vulcanization agents and vulcanization activators. Additionally, in the background thereof, it is disclosed as known that SBR and EPR rubbers and polybutadienes have high adhesion to polysulfones, polycarbonates and certain polyphenylene ethers after a thermal treatment.

Further, vulcanization is known is the art as a means of attaching shoe portions to each other. U.S. Pat. No. 4,130,947 to Denu discloses an outsole layer extending across the entire bottom of the shoe which has been vulcanized to a softer midsole layer. U.K. Patent Specification No. 298,718 to Looms et al. discloses vulcanizing a separate forefoot tread member and a heel tread member to a sole base or foundation. U.S. Pat. No. 4,676,010 to Cheskin discloses a sole having a plurality of discontinuous and independent outsole pieces attached to the lower surface of the midsole by vulcanization. The exposed lower surface of the midsole is asserted as making a significant contribution to the flexibility and weight reduction of the sole. However, because of the chemical make up and the dissimilar properties of rubbers versus thermoplastics and thermoplastic elastomers, vulcanization of one to the other without pretreatment of one or both substrates cannot effectively be achieved.

The aforementioned methods of chemically bonding rubber and plastic together typically utilize expensive machinery, and specific raw materials. In the footwear industry, in particular, manufacturing cost is of paramount concern. Thus, there is a need in the art for reduction of costs of production including improving efficiency of manufacture and decreasing the cost of raw materials.

It is generally known that the use of grooves in the outsole of an article of footwear improves the flexibility of the sole. See U.S. Pat. No. 4,562,651 to Frederick. U.S. Pat. No. 5,012,597 to Thomasson also discloses that the grooves reduce the thickness of the sole bottom at their locations and render the sole easier to bend at the locations of the grooves in the direction perpendicular to the grooves. The formation of grooves in the outsole and/or midsole for an article of footwear typically entails additional manufacturing or processing steps or the use of special molds designed to include the grooves. Thus, there exists a need to provide for enhanced flexibility in an outsole for an article of footwear which does not require the use of grooves.

U.S. Pat. No. 5,024,007 to DuFour discloses that a walking sole for a golf shoe which comprises an outsole comprised of a relatively rigid molded plastic material and an elastic plastic material has improved longitudinal flexibility and a greater degree of transverse rigidity. The elastic plastic material fills notches and elongated openings present in the relatively rigid molded plastic material. Outsoles comprised entirely of plastic materials typically are inappropriate for most articles of footwear, i.e., athletic footwear such as shoes for running, basketball, tennis, racquetball, etc. The excess rigidity, weight and lack of traction render outsoles comprised entirely of plastic materials undesirable for use in most athletic footwear. Outsoles comprised entirely of rubber materials for articles of footwear can lack necessary support.

Thus, there also exists a need to formulate an article of footwear which comprises an outsole having various physical and mechanical properties in different regions, and wherein these regions are adequately bonded to one another. There exists a need to provide an outsole for use in an article of footwear which has greater flexibility, less weight and has sufficient durability. Additionally, there is a need to provide an efficient and economical method for bonding relatively elastic and relatively inelastic materials for use in an article of footwear without utilizing adhesives.

SUMMARY OF THE INVENTION

The invention is directed to an article of footwear comprising relatively elastic and relatively inelastic materials chemically bonded together. In one aspect of the invention, plastic and rubber materials are bonded together to improve the flexibility of an outsole of an article of footwear. The invention also is directed to the fabrication of new or improved devices and elements for use in articles of footwear and their associated methods of construction such as closure mechanisms comprising relatively elastic straps bonded to relatively inelastic anchor portions and vice versa, articulating inelastic and elastic exoskeleton constructions useful in skates and ski boob and elastic or inelastic eyelets surrounded by inelastic or elastic materials, respectively. The invention also is directed to chemically bonding relatively elastic to relatively inelastic materials for use in protective athletic equipment such as helmets and protective padding, and for use in prosthetic devices.

In accordance with one aspect of the present invention, relatively elastic and relatively inelastic materials are chemically bonded together to improve the flexibility of outsoles for use in articles of footwear. Specifically, rubber and plastic materials are chemically bonded together to form flex lines or segments in the outsole. The flex lines or segments typically comprise the rubber component, and the remainder of the outsole comprises the plastic component. The rubber and plastic materials also may be arranged and chemically bonded to form an outsole having various configurations of the components so that improved flexibility is attained. The materials also may be arranged so that traction elements are present on the outsole. The relatively elastic and relatively inelastic materials also may be chemically bonded to form enclosure devices such as straps, eyelets, exoskeleton structures for use in skates and ski boots, heel plates, as well as other various functional applications on articles of footwear requiring or benefitting from the interplay of relatively elastic and inelastic materials chemically bonded to each other.

The articles of footwear made in accordance with the present invention are easy to manufacture, have reduced costs due to ease of manufacture and reduced amounts of raw materials, minimize or eliminate the use of adhesives, have improved flexibility and improved adhesion characteristics when compared to articles of footwear comprising plastic and rubber elastic materials bonded by conventional adhesives. These and other various features, advantages and objects of the present invention will be apparent from the following detailed description of the embodiments.

BRIEF DESCRIPTION OF THE DRAWINGS

FIGS. 20a and b are a posterior perspective view and a partial lateral view, respectively, of an article of footwear showing a rearfoot strap construction.

FIG. 21 is a partial plan view of a stability strap showing the use of plastic and rubber materials in the area about an eyelet for a shoelace.

DETAILED DESCRIPTION

The present invention is based on the improved flexibility and durability for articles of footwear that can be attained by chemically bonding relatively elastic and relatively inelastic materials which comprise the chemical constituency of various portions of the footwear article, for example of the outsole. Moreover, use of hazardous bonding materials such as adhesives is minimized or entirely avoided. The present invention also provides for an outsole of an article of footwear comprising the chemically bonded relatively elastic and relatively inelastic materials which has reduced thickness so that the resulting shoe is lighter, more flexible and costs less to manufacture.

Figure 2:
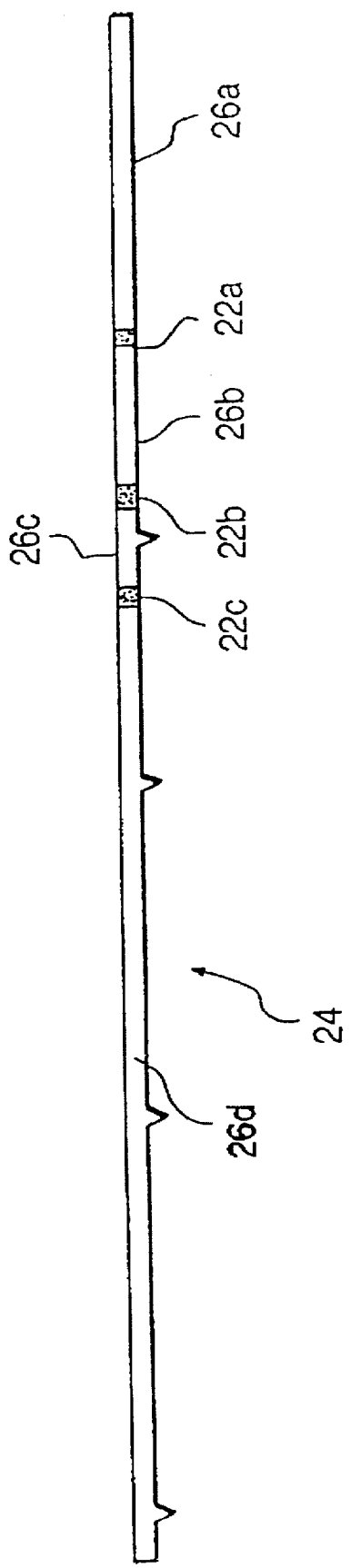
FIG. 2 is a cross-sectional view of the footwear outsole shown in FIG. 1 along line A—A showing rubber material extending between independent segments of plastic outsole plate material.

For example, an advantage of the present invention in an outsole embodiment versus the discontinuous outsole pieces of Cheskin (U.S. Pat. No. 4,676,010), Cheskin does not disclose or discuss bending ridged plastic to rubber. Further, Cheskin discloses a continuous midsole with discontinuous outsole pieces bonded thereto by vulcanization. On the other hand, in an outsole embodiment of the present invention, the outsole is a bonded composite of alternating plastic and rubber elements, for example as shown in FIG. 2. This eliminates the groove discontinuities present in the outsole of Cheskin and therefore improves wear of the outsole, e.g. enhancing the wear in the forefoot of tennis shoes. Further, such a composite outsole can improve traction on some surfaces, e.g. enhancing traction for basketball shoes by proper selection of materials and also by increasing the surface area of the outsole being used. Further, the continuous outsole can avoid damaging some surfaces, e.g. clay tennis courts, via sharp edges produced by grooves such as those presented in the discontinuous outsole of Cheskin. Further, this also produces a less likelihood of tripping resulting from the absence of such sharp edges produced by these grooves.

In one aspect of the invention, plastic and rubber materials are chemically bonded together to form an outsole of an article of footwear. For example, the plastic and rubber materials are chemically bonded through reactive functional groups either at the terminal ends or in the side chains of the polymeric plastic and rubber materials. The polymeric plastic or rubber materials may initially comprise the functional groups, or may be modified by reaction with a compound having the desired functional group to achieve the reactive functionality.

Throughout the specification and claims, the phrases "relatively elastic" and "relatively inelastic" mean that the materials are elastic and inelastic relative to one another. For example, the two materials may be elastic in the traditional sense, but a requirement of the present invention is that one of the materials have a greater elasticity than the other. Thus, relative to one another, one material is "relatively elastic" and the other is "relatively inelastic ". Accordingly, "relatively elastic" and rubber may be used interchangeably and "relatively inelastic" and plastic may be used interchangeably throughout the specification and claims.

Any relatively inelastic material may be used in accordance with the present invention as long as the relatively inelastic material is capable of forming a chemical bond with the relatively elastic material. Alternatively, the relatively inelastic materials may be modified to include pendent reactive groups which provide this capability. The relatively inelastic material may be primarily a solid material or may be foamed or blown using foaming and blowing agents, and may be foamed or blown by methods known in the art.

In particular, relatively inelastic materials useful in the present invention are plastic materials which typically have a hardness within the range of about 60–98 Shore A, and 25–90 Shore D, per ASTM D-2240. The modulus for desirable plastic plate materials useful in the present invention typically is from about 60 kg/cm$^2$ at 300% elongation to about 375 kg/cm$^2$ at 10% elongation, per ASTM D-412. Preferably, the plastic materials useful in the present invention have a hardness within the range of about 75–95 Shore A, and 35–80 Shore D, and more preferably, within the range of from about 85–90 Shore A, and 45–75 Shore D. Plastic materials with a Shore A ranging from about 65 to about 75 are particularly useful as outsole materials. Plastic materials with an Asker C ranging from about 45 to about 65 are particularly useful as midsole materials. Preferably, the modulus of plastic materials useful in the present invention is within the range of about 80 kg/cm$^2$ at 300% elongation to about 350 kg/cm$^2$ at 10% elongation and most preferably within the range of from about 110 kg/cm$^2$ at 300% elongation to about 300 kg/cm$^2$ at 10% elongation. For example, the prior art discloses that the thermoplastic multiblock copolymer elastomers used to make the midsoles typically have a Shore D hardness of from 25–45, preferably 30–43. When foamed if greater than 45, these elastomers do not have sufficient flexibility for midsole applications; and if less than 25, they have insufficient weight bearing capability. See U.S. Pat. No. 4,984,376 to Walter et al., incorporated herein by reference.

Any relatively elastic material which is capable of chemically bonding with the relatively inelastic material employed may be used. Alternatively, the relatively elastic materials may be modified to include pendant reactive groups which provide this capability. The relatively elastic material may be primarily a solid rubber material or may be foamed or blown by incorporation of known chemical or physical blowing agents. The relatively elastic materials are preferably rubber materials, including synthetic and natural rubber materials.

Typically, solid rubber materials useful in accordance with the invention have a hardness within the range of 30–90 Shore A Durometer, per ASTM D-2240. Preferably, the solid rubber materials have a hardness within the range of from about 40–80 Shore A Durometer, and more preferably within the range of from about 50–70 Shore A Durometer. The modulus of solid rubber materials useful in the present invention at 300% elongation is from about 10 to about 90 kg/cm$^2$, per ASTM D-412. Preferably, the modulus at 300% elongation is within the range of from about 20–80 kg/cm$^2$, and more preferably from about 30 to about 70 kg/cm$^2$.

The hardness of a foamed or blown rubber material useful in the present invention typically ranges from about 20 to about 90 Asker C Durometer, and the modulus of the foamed or blown rubber typically ranges from about 10 to about 90 kg/cm$^2$ at 150% elongation, from about 10 to about 80 kg/cm$^2$ at 200% elongation and from about 10 to about 60 kg/cm$^2$ at 300% elongation, per ASTM D-412. Preferably, the hardness of a foamed or blown rubber material ranges from about 50 to about 80 Asker C Durometer, and more preferably from about 40 to about 70 Asker C Durometer. Preferably, the modulus of the foamed or blown rubber ranges from about 10 to about 80 kg/cm$^2$ at 150% elongation, from about 20 to about 70 kg/cm$^2$ at 200% elongation and from about 10 to about 50 kg/cm$^2$ at 300% elongation. More preferably, the modulus of the foamed or blown rubber ranges from about 20 to about 60 kg/cm$^2$ at 150% elongation, from about 30 to about 60 kg/cm$^2$ at 200% elongation and from about 20 to about 40 kg/cm$^2$ at 300% elongation.

A difference of at least 10 points in hardness between the various materials to be joined by chemical bonding is desired to effect measurable and subjectively discernable difference in hardness and flexion. The basis for the "10 points in hardness" depends on the material being used. For example, Shore A is used for flexible to semi-rigid materials; Shore D is used for rigid, mostly thermoplastic materials having a Shore A greater than 90; and Asker C is used for soft microcellular foams and similar materials. However, it is well known to those skilled in the art that beyond a certain point, certain materials may become to soft or too hard to effect such a measurable and subjectively discernable difference in hardness and flexion.

In accordance with the claimed invention, the relatively inelastic material may comprise a plastic material selected from the group consisting of thermoplastic polyurethane, polyamide, polyethylene, nitrile, polyvinyl chloride, ethylene vinyl acetate (EVA), polyester, polycarbonate, polypropylene, polyphenylene ether, styrene, vinyl, PEBAX® (polyether block amide), TYVEC® (polyethylene) TEFLON® (tetrafluoroethylene) and TEDLAR® (fluoropolymers), MYLAR® and MELINEX® (thermoplastic polyesters), HYPALON® (chlorosulfonated polyethylene elastomer) and LEXANE® (polycarbonates).

Suitable plastic materials include polymers having functional moieties, i.e., polar polymers. The functional moieties render the plastic material reactive with the rubber material which also may comprise reactive pendant functional moieties. Typical polar polymers may be selected from the group consisting of polyamides, thermoplastic polyesters, thermoplastic polyurethanes, vinyl alcohol polymers, vinyl ester polymers, nitrile polymers, ionomers and halogenated thermoplastics. Such polar polymers are disclosed in U.S. Pat. Nos. 4,080,357; 4,429,076; 4,628,072; 4,657,970; and 4,657,971, the disclosures of which are herein incorporated by reference. Polyphenylene ethers and polycarbonates may also be useful. Furthermore, it is to be noted that polar polymers having more than one functional group capable of chemically bonding with the rubber material or functionalized rubber material are within the scope of the invention. Thermoplastic polyurethane have differing physical characteristics, chemical properties and applications (or uses) and accordingly may be referred to as urethane, thermoplastic urethane or polyurethane. The distinction among these terms is known to those in the athletic shoe art.

As with other thermoplastics, such plastic materials may be foamed. Exemplary of some of the plastics which have been foamed include polystyrenes, polyolefins, polycarbonates, polyurethanes, polyesters and aldehyde based condensation resins and the like. See U.S. Pat. Nos. 2,959,508; 3,717,559; 3,704,269; 3,753,933; 3,863,000; 4,097,425; 4,002,581; 4,226,949; 4,247,652; 4,312,960; 4,588,754; and 4,984,376, the disclosures of which are hereby incorporated by reference.

The rubber materials useful in the present invention may comprise homopolymers of conjugated diene monomers, copolymers of two or more conjugated dienes and copolymers of one of the dienes with a monoalkenyl arene, preferably wherein the copolymer predominates in conjugated diene units. The conjugated dienes preferably comprise from 4 to 8 carbon atoms. Examples of suitable conjugated diene monomers include butadiene, isoprene, 2,3-dimethyl-1,3-butadiene and piperylene. Rubber materials useful in the present invention include, but are not limited to, materials selected from the group consisting of styrene butadiene rubber (SBR), styrene butadiene rubber/natural rubber (SBR/NR), ethylene-propylene diene monomer/styrene butadiene rubber (EPDM/SBR), carboxylated nitrile rubber (XNBR), polyisoprene rubber (IR), milliable urethane, polychloroporene (neoprene), bromobutyl rubber, chlorosulfonated polyethylene, thermoplastic rubber, latex, silicone, and other natural and synthetic rubbers. Preferably, the rubber material is selected from SBR, SBR/NR, EPDM/SBR and XNBR.

Other elastomers useful as rubber materials in the present invention include block copolymers comprising a relatively inelastic or "hard" phase and a relatively elastic or "soft" phase. The preparation of such block copolymers is known. See U.S. Pat. Nos. 4,174,358; 4,292,414; 4,783,503; 4,795,782; 4,797,447; 4,868,243; 4,868,245; 4,882,384; 4,898,914; and 4,906,687, the disclosures of which are herein incorporated by reference.

The rubber material may be chemically modified to facilitate the chemical bond between the plastic material and the rubber material. Modification of the rubber material typically comprises addition of a modifying agent to the base rubber which imparts functional reactivity to the rubber material. The mode of such addition may be, for example, by means of a surface preparation or by dispersion within the rubber material. The functional reactivity imparted to the rubber material is due primarily to the incorporation of free hydroxyl, carboxyl, amino, ester, ether and the like linkages of the modifying agent. Typically, the modifying agent reacts with the polymeric backbone of the rubber material but may react with polymeric terminal group(s). For example, maleic anhydride, maleic acid, fumaric acid, and the like may be added to the rubber to form an adduct with the ethylenic unsaturation present in the rubber material and impart carboxylic acid functionality to the rubber. These polymers, by virtue of the presence of the pendent succinic anhydride group, can be reacted under appropriate conditions with the amide or amine groups of a polyamide to produce a chemical bond between the modified rubber and plastic materials. See U.S. Pat. Nos. 3,887,527; 4,292,414; 4,427,828; 4,429,076; 4,578,429; 4,657,970; and 4,795,782, the disclosure of which are hereby incorporated by reference.

Reactive functionality, for example, carboxyl groups, may be incorporated into the alkenylarene potion of the rubber material, such as those having no ethylenic unsaturation, or into both the alkenylarene portion and other portions thereof having ethylenic unsaturation. See U.S. Pat. Nos. 4,783,503; 4,797,447; 4,898,914; and 4,906,687, the disclosures of which are herein incorporated by reference.

The rubber material may be foamed or blown by use of foaming or blowing agents. Physical foaming and blowing agents function as gas sources by undergoing a change in the phase state. Suitable physical blowing and foaming agents may be selected from the group consisting of aliphatic hydrocarbons and their chloro- and fluoro-derivatives. Typical foaming and blowing agents may be selected from the group consisting of isomers of pentane, hexane, heptane, fluorocarbons, trichlorofluoromethane, dichlorodifluoromethane, dichlorotetrafluoroethane, monochlorodifluoromethane, methylene chloride, carbon dioxide, water and nitrogen. For example, water is a used as a blowing agent for microcellular polyurethane. Further, nitrogen is used as a mechanical blowing agent for thermoplastic foams.

Chemical foaming and blowing agents produce a gas via a chemical reaction. Suitable chemical foaming and blowing agents may be selected from the group consisting of sodium bicarbonate, dinitrosopentamethylene-tetramine, sulfonyl hydroxides, azodicarbonamide, p-toluenesulfonyl semicarbazide, 5-phenyltetrazole, diisopropylhydrazodicarboxylate and sodium borohydrite. The thermal decomposition of the foaming or blowing agents can be lowered through addition of activators, accelerators, or kickers. Water also may be employed as a blowing or foaming agent for resilient materials such as urethanes and polyurethanes. The rubber material may be foamed or blown using the aforementioned foaming and blowing agents by methods known in the art. The chemical bond may be formed between the plastic and rubber materials in accordance with any the following five methods: (1) utilizing plastic and rubber materials already having reactive functional groups to facilitate a chemical bond between the plastic and rubber materials; (2) modification of the plastic material to incorporate reactive functional groups to facilitate a chemical bond between the plastic and rubber materials; (3) modification of the rubber material to incorporate reactive functional groups to facilitate a chemical bond between the plastic and rubber materials; (4) modification of both the plastic and rubber materials to incorporate reactive functional groups for the purpose of producing a chemical bond therebetween; and (5) adding a bridging compound having reactive functional groups which react with the reactive functional groups on the plastic and rubber materials which are non-reactive toward each other.

Modification of the plastic and/or rubber material typically comprises addition of functional moieties which ultimately yield pendant carboxylic acid, amide, hydroxyl and other reactive functional groups to these materials. Preferred functional groups may be selected from the group consisting of an amino group, a hydroxyl group, a thiol group, a carboxyl group, an isocyanide group, an epoxy group, an ether group, an aldehyde group, a borane group, a silicon group and groups derived therefrom such as a urethane group, an ester group, an amide group, an ammonium salt group and a metal carboxylate group. These functional groups may be bonded to either the terminals or the side chains of the plastic or rubber polymeric material. These materials may also be modified by incorporating ethylenic unsaturation which may be activated during vulcanization.

Other additives may be added to the plastic and rubber materials. Additives include other rubbers, fillers such as carbon black, processing agents, softening agents, metal fibers, graphite, colorants, accelerators, fumed and precipitated silicas, adhesion promoters and the like. These additives may be present in conventional amounts.

For illustrative purposes, the following detailed descriptions of certain thermoplastics and rubber materials are included herein. Polyamides useful in the present invention typically comprise a condensation product which contains recurring aromatic and/or aliphatic amide groups as integral parts of the main polymer chain, such products being known genetically as "nylons". See U.S. Pat. No. 4,906,687, incorporated herein by reference. These may be obtained by polymerizing a monoaminocarboxylic acid or an internal lactam thereof having at least two carbon atoms between the amino and carboxylic acid groups ($\alpha$-polyamides), or by polymerizing substantially equimolar proportions of a diamine which contains at least two carbon atoms between the amino groups and a dicarboxylic acid ($\alpha,\omega$-polyamides), or by polymerizing a monoaminocarboxylic acid or an internal lactam thereof with substantially equimolecular proportions of a diamine and a dicarboxylic acid. Polyamides also may comprise a polycondensate of a dicarboxylic acid and a diamine, a polycondensate of an $\alpha$-aminocarboxylic acid and a polymer produced by ring-opening polymerization of a cyclic lactam. The $\alpha$-polyamide have a terminal amino group and the $\alpha,\omega$-polyamide have two terminal amino groups which are capable of reacting with a functional group on the rubber material, for example a carboxyl group.

Polyamides which may be used in accordance with the present invention include polyhexamethylene adipamide (nylon 66), polypyrrolidone (nylon 4), polycaprolactam (nylon 6), polyheptolactam (nylon 7), polycapryllactam (nylon 8), polynonanolactam (nylon 9), polyundecanolaetam (nylon 11), polydodecanolactam (nylon 12), polyhexamethylene azelaiamide (nylon 69), polyhexamethylene sebacamide (nylon 610), polyhexamethylene isophthalamide (nylon 6iP), polymethaxylylene adipamide (nylon MXD6), polyamide of hexamethylenediamine and n-dodecanedioic acid (nylon 612), and polyamide of dedecamethylenediamine and n-dodecanedioic acid (nylon 1212). These polymers may be used alone or in combination with one another. Nylon copolymers also may be used, for example, copolymers of the following: hexamethylene adipamide/caprolactam (nylon 66/6), hexamethyleneadipamide/hexamethylene-isophthalamide (nylon 66/iP), hexamethylene adipamide/ hexamethyleneterephthalamide (nylon 66/6T), hexamethylene adipamide/hexamethylene-azelaiamide (nylon 66/69) and hexamethyleneadipamide/hexamethyleneazelaiamide/ caprolactam (nylon 66/69/6). Particularly preferred nylons include nylon 66, nylon 6, nylon 11 and nylon 12, mixtures and copolymers thereof.

The polyamides used in accordance with the present invention typically have a number avenge molecular weight ($M_n$) within the range of about 200 to about 50,000. Preferred polyamides are those having number avenge molecular weights of at least 5,000. The melting point of the polyamide used in accordance with the present invention typically is within the range of from about 150° C. to about 270° C., and preferably within the range of from about 150° C. to about 220° C.

Polyesters which can be used in accordance with the present invention typically comprise a thermoplastic polyester having an ester linkage in the molecule, and a polyester having a structure formed by polycondensation of a dicarboxylic acid with a glycol. See U.S. Pat. No. 4,906,687, previously incorporated herein by reference. Polyesters of this type are obtained by polycondensing a dicarboxylic acid or a lower ester, acid halide or acid anhydride thereof with a glycol. As the starting aromatic or aliphatic dicarboxylic acid, there are preferably used oxalic acid, malonic acid, succinic acid, glutaric acid, pimelic acid, suberic acid, adipic acid, sebacic acid, azelaic acid, 1,9-nonane-dicarboxylic acid, 1,10-decane-dicarboxylic acid, 1,16-hexadecanedicarboxylic acid, terephthalic acid, isophthalic acid, p,p'-dicarboxyphenyl, p-carboxyphenoxyacetic acid and 2,6-naphthalene-dicarboxylic acid. Mixtures of two or more of these dicarboxylic acids also may be used. Of the above-mentioned dicarboxylic acids, terephthalic acid and isophthalic acid are particularly preferred.

An aliphatic or aromatic glycol (or diol) is used as the other starting material of the polyester. For example, there can be mentioned ethylene glycol, 1,3-propane diol, 1,2-propane diol, 1,4-butane diol, 1,6-hexane diol, 1,4-cyclohexane diol, 1,10-decane diol, neopentyl glycol and p-xylene glycol. These glycols may be used singly or in the form of a mixture of two or more of them. Of these glycols, alkylene glycols having 2 to 10 carbon atoms are preferred, and ethylene glycol and 1,4-butane diol are particularly preferred. Particularly preferred polyesters produced by polycondensation of the dicarboxylic acid with the glycol are polyethylene terephthalate and polybutylene terephthalate, and modified products thereof in which the monomer units are partly substituted with other monomer units.

From the standpoint of process ability and mechanical strength of the composition, the number average molecular weight of the polyester is generally 500 to 100,000 and preferably 5,000 to 50,000.

The polymerization method for formation of the polyester used in the present invention is not particularly critical, and the polymerization may be carried out according to customary procedures. For example, there may be mentioned a method in which the above-mentioned acid component, for example, terephthalic acid, isophthalic acid, an aliphatic dicarboxylic acid or an ester thereof is subjected to direct esterification or ester exchange reaction with at least one member selected from the above-mentioned glycols one at a time, or stepwise. Polymerization then is conducted. Catalysts, stabilizers, modifiers and additives customarily used may optionally be added.

Another valuable polyester Which may be used in the present invention is a polylactone obtained by ring-opening polymerization of a cyclic lactone such as pivalolactone, β-propiolactone or ε-caprolactone.

The above-mentioned polyesters have hydroxyl or carboxyl groups at the terminal ends of the molecule, and these terminal functional groups may be rendered unreactive by reaction with a monofunctional alcohol or carboxylic acid. It is preferred that all or part of the terminal ends of the molecule of the polyester have functional groups capable of reacting with the functional groups of the rubber material. The polyester having these functional groups has a remarkably improved compatibility with the rubber material because part of these functional groups is reacted with the rubber material. In the present invention, the foregoing polyesters may be used alone or in combination thereof.

The thermoplastic polyester referred to in the present invention includes polyesters used as fibers, film or resins, such as polyethylene terephthalate, low crystalline polyesters having a lower melting point, and polyether-ester block copolymers containing hard segments and soft segments in the molecule.

Thermoplastic polyurethanes which are useful in the present invention are divided into completely thermoplastic polymers and incompletely thermoplastic polymers according to the synthetic conditions, that is, the molar ratio of the NCO group of the diisocyanate relative to the OH group of the starting bifunctional polyol or glycol. More specifically, the polyurethane synthesized in a molar ratio of about $0.95 < NCO/OH \leq 1$ is a completely thermoplastic polyurethane, and the polyurethane synthesized in a molar ratio of about $1 < NCO/OH < 1.1$ is an incompletely thermoplastic polyurethane. As the thermoplastic polyurethane, there may be mentioned a polyurethane comprising a block of a polyol (polyester or polyether) and a diisocyanate as a soft segment and a block of a diisocyanate and a glycol as a hard segment.

As the starting polyester diol, poly(1,4-butylene adipate), poly(1,6-hexane adipate) and polycaprolactone may be used, and as the polyether diol, polyethylene glycol, polypropylene glycol and polyoxytetramethylene glycol may be used. As the glycol, ethylene glycol, 1,4-butane diol and, 1,6-hexane diol may be used. As the diisocyanate, aromatic, alicyclic and aliphatic diisocyanates may be used. For example, there may be used tolylene diisocyanate, 4,4'-diphenylmethane diisocyanate, hexamethylene diisocyanate and isophorone diisocyanate.

Besides the foregoing thermoplastic polyurethanes, polyurethanes customarily used as foams may be used for the composition of the present invention, so far as they have a sufficient compatibility with the rubber material in the present invention. From the standpoint of mechanical characteristics of the composition, it is preferred that the number average molecular weight of the thermoplastic polyurethane be 1,000 to 500,000. Within this range, preferred ranges are known to those skilled in the art for desired applications. For example, the prior art in U.S. Pat. No. 4,627,178 to Sullivan et al. discloses that polyurethane elastomers may range from about 1,000 to 10,000, for example 4,000 to 8,000 for midsole applications.

In the present invention, homopolymers of vinyl esters and olefin-vinyl ester copolymers, such as polyvinyl acetate, ethylene-vinyl acetate copolymers and propylene-vinyl acetate copolymers, may be used as the vinyl ester polymer.

The vinyl alcohol polymers which may be used in the present invention include a polymer composed of vinyl alcohol units and a copolymer containing vinyl alcohol units. The polymer composed of vinyl alcohol units is a polymer obtained by partially or completely saponifying a vinyl ester polymer with an aqueous alkali. In the present invention, various polyvinyl alcohols can be used. An olefin-vinyl alcohol copolymer is preferably used as the copolymer containing vinyl alcohol units, and from the standpoint of processability and mechanical characteristics of the composition, an ethylene-vinyl alcohol copolymer is particularly preferred. The ethylene-vinyl alcohol copolymer is synthesized from the corresponding ethylene-vinyl acetate copolymer as the starting substance. An ethylene-vinyl acetate copolymer having a vinyl acetate content of 0.5 to 80 mole % is generally used, and an ethylene-vinyl alcohol copolymer obtained by saponifying 10 to 100 mole % of the vinyl acetate units of this ethylene-vinyl acetate copolymer is generally used.

Thermoplastic homopolymers and copolymers synthesized by using at least 50% by weight of an α,β-olefinically unsaturated mononitrile as the constituent monomer are preferably used as the nitrile polymer in the present invention. As the α,β-olefinically unsaturated mononitrile, there may be mentioned, for example, acrylonitrile, methacrylonitrile and α-bromoacrylonitrile. A mixture of two or more of these monomers may be used. As the monomer to be copolymerized with the α,β-olefinically unsaturated mononitrile, there may be mentioned lower α-olefins such as ethylene, propylene, isobutylene, pentene-1, vinyl chloride and vinylidene chloride; monovinyl substituted aromatic hydrocarbons such as styrene, α-methylstyrene, vinyltoluene, chlorostyrene and methylstyrene; vinyl esters such as vinyl acetate; lower alkyl esters of α,β-olefinically unsaturated carboxylic acids such as methyl acrylate and methyl methacrylate; and vinyl ethers such as vinyl methyl ether.

Another preferred modified plastic material useful in accordance with the present invention comprises a polyphenylene ether based on 2,6-dimethyl-1,4-phenylene ether as the polymeric constituent which is modified by addition of polyalkenylenes and styrene polymers, and is characterized by its amorphous structure which causes it to shrink less on processing, and has a reduced tendency to warp, as disclosed in U.S. Pat. No. 4,921,762, incorporated herein by reference.

The polyphenylene ethers can be produced from 2,6-dimethylphenol, for example, in the presence of complex forming agents such as copper bromide and morpholine as described in DE-OS 32 24 692 and DE-OS 32 24 691. Typically, the polyphenyene ethers are added as a powder or a granular material.

Polyalkenylenes added to the polyphenylene ether typically are produced by ring opening or ring expansion polymerization of cycloalkenes as described in K. J. Irvin, T. Sagusa "Ring-opening Polymerization," Vol. I, Elsevier Appl. Sci. Publishers, London, pp. 121–183 (1984) herein incorporated by reference. Preferred polyalkenylenes are derived from $C_{5-12}$ cycloalkenes, with polypentenes, polydodecenylenes and polyoctenylenes being particularly preferred.

Polyoctenylenes prepared in accordance with the methods disclosed in A. Draxler, Kautschuk and Gummi, Kunststoff 1981, pages 185 to 190 are preferred. Polyoctenylenes having varying cis and trans double bond ratios, varying J-values, and correspondingly varying molecular weights are obtainable according to methods known from the literature. Polyoctenylenes having a viscosity number (J value) ranging from 50 to 350 ml/g, preferably from 80 to 160 ml/g, measured in a 0.1% solution in toluene are preferred. 55 to 95%, preferably 75 to 85%, of the double bonds are in the trans-form.

Known styrene homopolymers and/or impact resistant styrene polymers can be added as additional components of the polyphenylene ether plastic material. DE-OS 36 02 705 discloses suitable styrene polymers. The styrene polymer may be modified by incorporating an EP rubber, for example, EPM rubber and EPDM rubber. Vulcanization agents and activators may be used in such systems.

The EPM rubber is produced in the conventional manner by polymerization of a mixture comprising 25–75% by weight ethylene and 75–25% by weight propylene in the presence of a Ziegler-Natta catalyst, such as, e.g., diethyl aluminum chloride.

The EPDM rubber is produced, analogously, by polymerization of a mixture comprising more than 25% ethylene, more than 25% propylene and 1–10%, in particular, 1–3%, of a diene. This diene should not be conjugated. Bicyclo(2, 2,1)heptadiene, 1,4-hexadiene, dicyclopentadiene, and particularly, 5-ethylidene-norborene are preferred. Suitable EPDM rubbers are produced under the trade name BUNA® AP (EPDM rubber) by Bunawerke Huls GmbH, D-4370 Marl Germany.

Suitable peroxidic vulcanization agents are those peroxides known in the art for cross-linking, for example, EPDM rubbers, such as 2,5-dimethyl-2,5-bis(tert-butylperoxy) hexane, dicumyl peroxide, 4,4-di-tert-butylperoxy-n-butylvalerate, 1,1-di-tert-butylperoxy3,3,5-trimethylcyclohexane and in particular bis(tert-butylperoxyisopropyl)benzene. The use of these peroxidic vulcanization agents in preparing EPDM rubbers is described in the brochure "Rubbery Chemicals-Crosslinking Peroxides" of Akzo Chemie (April 1985).

Suitable vulcanization activators include triallyl cyanurate (TAC), acrylates such as 1,4-butanediol-dimethacrylate (BDMA) and trimethylolpropane trimethacrylate (TRIM). Particularly preferred vulcanization activators include TAC and/or BDMA.

If desired, the polyphenylene ether material may contain other derivatives such as stabilizers, processing agents, foaming agents, metal fibers, rubber black, graphite, metal spangles, titanium dioxide and zinc sulfide. The weight ratio of reinforcing agents in the polyphenylene ether material can vary anywhere from about 0% to about 50%, that of the flame retardant up to about 15% and all other additives to a total of about 5%, with respect to the total polyphenylene ether material.

Preferably the polyphenylene ether plastic materials are produced by mixing the components in the melted state. At least one component is completely melted and the melt thus obtained is mixed with the other components. Another possibility is to melt and mix all of the components together. Melting temperatures typically range from about 250° C. to about 350° C., in particular from about 260° C. to about 300° C., and curing times typically range from about 0.3 to about 10 minutes, in particular, from about 0.5 to about 3 minutes. Conventional equipment for processing highly viscous melts, not only in batch runs but also in continuous operations, are suitable for melting and mixing. Twin-screw kneaders and co-kneaders are especially suitable. Other methods of producing the polyphenylene ether plastic materials are disclosed in U.S. Pat. No. 4,921,762, previously incorporated herein by reference.

Typical rubber constituents which bond effectively to such modified polyphenylene ether plastic materials include, but are not limited to, rubbers such as SBR, natural rubbers, SBR/NR, BUNA® AP, EPDMJSBR, BUNA® EM, XNBR, IR, BUNA® SL, CB, Vi and AP, NR, IIR CiiR, and PNR, and mixtures thereof. The SBR and BR blends typically are crosslinked with sulphur or sulphur donors, and the EPDM blends typically employ peroxides as vulcanization agents. The rubber material also may comprise conventional fillers, plasticizers, vulcanization agents, accelerators and the like.

A preferred modified rubber is a butadiene homopolymer adducted with maleic anhydride. More preferably, the modified rubber material comprises 1,2-polybutadiene polymer adducted with maleic anhydride such as that commercially available under the trade name RICO-BOND® 1031 (maleic anhydride resin), CAS#25655-35-0, produced by Advanced Resins, Inc., Grand Junction, Colo. RICO-BOND® 1031 (maleic anhydride resin) serves as an adhesion promoter by imparting reactive carboxyl and ester linkages and ethylenic unsaturation to the rubber material. RICO-BOND® 1031 (maleic anhydride resin) may be used to modify other rubbers such as BRS 1000, SBR, IR and the like.

The method of chemically bonding the two materials typically encompasses molding the plastic material first, and then subjecting the rubber to a heat and/or pressure treatment or vulcanization in the presence of the plastic material. The solidification temperature of the plastic material is preferably higher than the thermal treatment or vulcanization temperature of the rubber materials utilized. Therefore, the plastic material does not degrade during the chemical bonding process. Skilled practitioners are capable of determining injection molding operating parameters for various plastics, rubbers, and modified plastics and rubbers.

Typically, the plastic material is prepared as described above, and then compressed with an elastomeric thermoplastic, e.g., pressed together by press curing, injection molding, or by extrusion. In the process, the rubber material typically is heated to at least the temperature required for thermal treatment or vulcanization. Suitable temperatures range from about 280° to about 550° F., and preferably from about 320° to about 420° F. Skilled practitioners recognize that these temperatures vary for the particular rubber employed as well as the various reactive functional groups employed. The treatment time required may vary within the range of from about 1 minute to about 15 minutes, and preferably from about 3 minutes to about 7 minutes.

Other injection molding parameters useful in forming the plastic material of the present invention are known to skilled practitioners in the art. For example, skilled practitioners recognize the effect of processing parameters and are capable of optimizing parameters such as injection volume flow, filling time, injection speed, holding pressure and holding time. Skilled artisans recognize that the magnitude of the holding pressure influences shrinkage of the plastic material, sink marks and weight, and that the holding pressure should be high enough to avoid sink marks. It also is known that cooling time and temperature affect shrinkage and warpage and should be optimized to minimize the effects. Finally, it is known that the properties of the plastic material are predominantly determined during the filling phase, the mechanical properties are affected by the batch temperature, and shrinkage and warpage typically occur during the holding or cooling phase.

Generally, in forming the chemical bond between the plastic and rubber materials, the injection molding, thermal treatment and vulcanization conditions are optimized to form the strongest bond while minimizing adverse effects. For example, the formation of surface glaze on the plastic material should be avoided. Surface glaze can be eliminated by thorough drying of the granulated plastic material and by the use of a vent in the extruder. Oxidation of the surface of the plastic material also should be presented. Oxidation of the surface can be eliminated by grinding the surface of the plastic material before thermal treatment or vulcanization with the rubber material, or by use of a nitrogen blanket. The surface of the plastic material also should be adequately cleaned before thermal treatment or vulcanization with the rubber material. This can be accomplished by use of aliphatic solvents and soap solutions. However, use of polar hydrocarbons such as aromatics and chlorohydrocarbons should not be employed to avoid deactivation of the functional groups on the plastic and rubber materials.

During the thermal treatment or vulcanization phase, movement between the plastic and rubber materials should be avoided. Also, during hot mold removal, the rubber material should not be stretched, and during the cooling phase, the rubber and the plastic materials should not be allowed to shrink away from each other. Avoidance of these conditions will ensure an adequate chemical bond between the rubber and plastic materials.

The plastic and rubber materials also may be chemically bonded in a one step process known commonly under the names "co-extrusion", "one-stage two-color injection molding" and "two-component injection molding." Skilled practitioners are familiar with these methods and are capable of adapting the processes to various plastic and rubber materials.

The plastic and rubber materials also may be chemically bonded to each other wherein one of the materials is a fabric of natural and synthetic materials. For example, a relatively inelastic plastic material known as PEBAX® (polyether block amide), a polyester block amide available from Elf ATOCHEM N.A., Inc. (Elf Aquitaine), Philadelphia, Pa., has been bonded to several relatively inelastic materials such as XNBR rubber, and various fabric materials such as polyester and cotton/polyester blends. The fabrics and PEBAX® (polyether block amide) sheets were cut in about 8 inch squares. A sandwich of TEFLON® (tetrafluoroethylene) sheets and the materials was assembled as follows: First, a "9×15" TEFLON® (tetrafluoroethylene sheet) with a PEBAX® (polyether block amide) sheet on top of the teflon sheet. A 9" square TEFLON® (tetrafluoroethylene sheet) covers approximately half of the PEBAX® sheet. The fabric material was then placed evenly over the PEBAX®/TEFLON® (tetrafluoroethylene) so that only half of the sheet is in direct communication with the PEBAX® (polyether block amide), and therefore capable of bonding thereto. Aother 9" square of TEFLON® (tetrafluoroethylene) covers the other half of the fabric sheet. The sandwich then is completely covered with another 9"×15" TEFLON® (tetrafluoroethylene) sheet.

The sandwich then was placed in a fabric bonding press at about 360° F., the platen temperature was measured at between about 415° F. to about 425° F., and the platen pressure set at about 75 psi. Two sets of PEBAX® (polyether block amide) sheets were tested, one being PEBAX® 3533 (polyether block amide), and the other PEBAX® 5533 (polyether block amide). The 3533 sandwich remained in the fabric press for about 3 minutes whereas the 5533 sheets remained in the press for about 4 minutes. The sandwiches then were cooled in a Carver platen press for about 2 to about 3 minutes at about 2,000 psi.

Because only half of the sheets were bonded, a pulling test was conducted where a variable load was placed on the half of unbonded fabric in the opposite direction to a load placed on the bonded fabric. The values represented in Table 1 below represent the load at which the materials were separated.

When XNBR was used as the fabric material, the TEFLON® (tetrafluoroethylene) sandwich was not used. Rather, the materials were vulcanized at about 160° C. in a 2 Ton Rubber Press at about 1500 to about 2000 psi for about six (6) minutes. The carboxylic acid groups present in the XNBR rubber reacted with PEBAX® (polyether block amide) material to form a strong chemical bond therebetween. When subjected to the pulling test described above, the rubber material fractured, and the material was incapable of being separated at the bond juncture due to the strong chemical bond formed between the XNBR rubber and PEBAX® (polyether block amide) materials.

The following Table 1 represents the maximum peeling load applied, and the resulting peeling strengths achieved when the TEFLON® sandwiches comprising the PEBAX® (polyether block amide) material and fabrics listed were subjected to the peeling loads.

TABLE 1

| Fabric Material | PEBAX | Maximum Peeling Load (lbs.) | Avg. Peel Strength (lbs./in.) |
| --- | --- | --- | --- |
| Fine Glass Fabric | 3533 | 5.3 | 3.4 |
| Coarse Glass Fabric | 3533 | 27.5 | 20.2 |
| Fine Polyester Fabric | 3533 | 33.6 | 27.5 |
| Coarse Polyester Fabric | 3533 | 19.7 | 14.7 |
| Nylon Fabric | 3533 | 10.5 | 6.8 |
| 50/50 Cotton/Polyester Blend | 3533 | 7.3 | 4.9 |
| Polyester Dipped in Adhesive | 3533 | 31.9 | 25/5 |
| Fine Glass Fabric | 5533 | 4.5 | 2.8 |
| Coarse Glass Fabric | 5533 | 44.7 | 28.5 |
| Fine Polyester Fabric | 5533 | 30.9 | 24.4 |
| Coarse Polyester Fabric | 5533 | 13.4 | 9.1 |
| Nylon Fabric | 5533 | 17.7 | 12.1 |
| 50/50 Cotton/Polyester Blend | 5533 | 7.3 | 4.5 |
| Polyester Dipped in Adhesive | 5533 | 31.7 | 22.5 |

As can be seen from the above table, it is possible to form a relatively strong chemical bond which is resistant to fracture between a relatively inelastic material such as PEBAX® (polyether block amide) and relatively elastic materials such as glass, polyester and cotton fabric materials. Accordingly, an article of footwear can be manufactured wherein plastic materials are chemically bonded to the fabrics used in formulating the upper.

The following discussion pertains to various embodiments of the present invention utilizing chemically bonded plastic and rubber materials.

Figure 1:
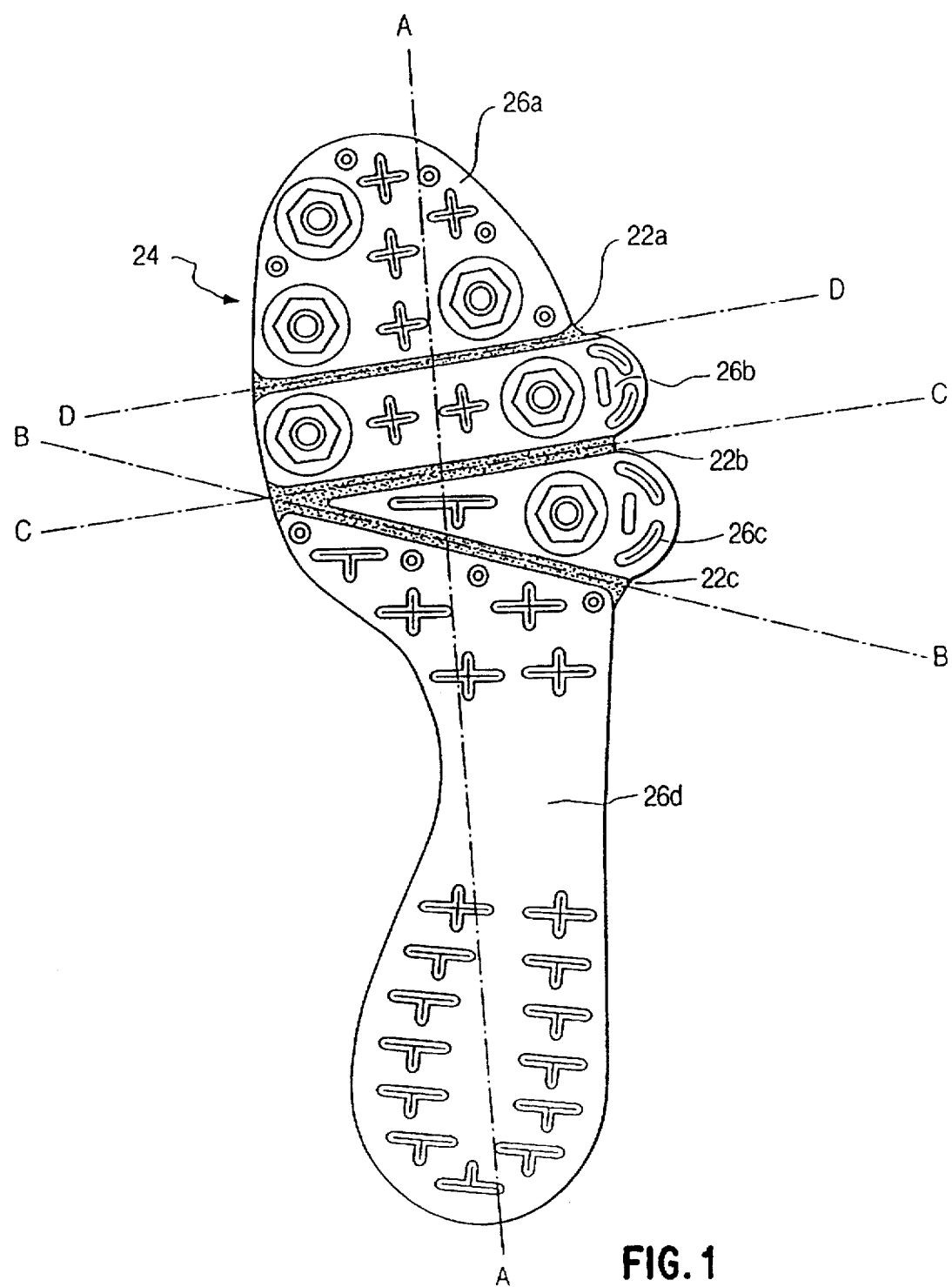
FIG. 1 is a plan view of a "v-flex" footwear outsole showing the use of rubber bonded to and joining adjacent plastic outsole segments wherein the rubber flex lines form a v-shape and replace the "v-grooves" of the prior art.

Referring to the drawings, wherein like numerals represent like elements, shown in FIG. 1 is an outsole 24 comprising outsole segments 26 a–d of a plastic material which are chemically bonded along desired lines of flexion B—B, C—C, and D—D to rubber segments 22 a–c, respectively, forming rubber flex lines. A cross-sectional view of FIG. 1 along line A-A is shown in FIG. 2 and shows rubber segments 22 a–c extending between independent outsole segments 26 a–d. Rather than having independent outsole segments, it can be readily understood that an alternate embodiment could comprise a footwear outsole 24 of a plastic material having a reduced profile or cross-section along or about the desired line of flexion, e.g., a groove or channel, and effectively substitute a more flexible rubber material for the less flexible plastic material by filling in the grooves or channels with rubber material and bonding the rubber material to the plastic outsole 24 to yield an outsole having a bottom perspective as shown in FIG. 1.

Shown in FIG. 2 (24) is a cross-sectional view along line A—A of the footwear outsole 24 shown in FIG. 1 showing four separate outsole segments 26a–d, substantially consisting of plastic material adjoining rubber segments 22 a–c which are chemically bonded thereto. This construction permits greatly enhanced flexibility as compared to conventional outsole plates. In addition, it can be readily understood that rubber segments 22 a–c can be inclined relative to verticle to increase bonding surface and affixed to the superior, or inferior, surfaces of outsole segments 26 a–d. It is further contemplated that horizontal segments of rubber may be affixed either over horizontal plastic segments or under horizontal plastic segments, i.e. continuous pieces of rubber and plastic may be affixed to each other over their facing horizontal surfaces.

Figure 3:
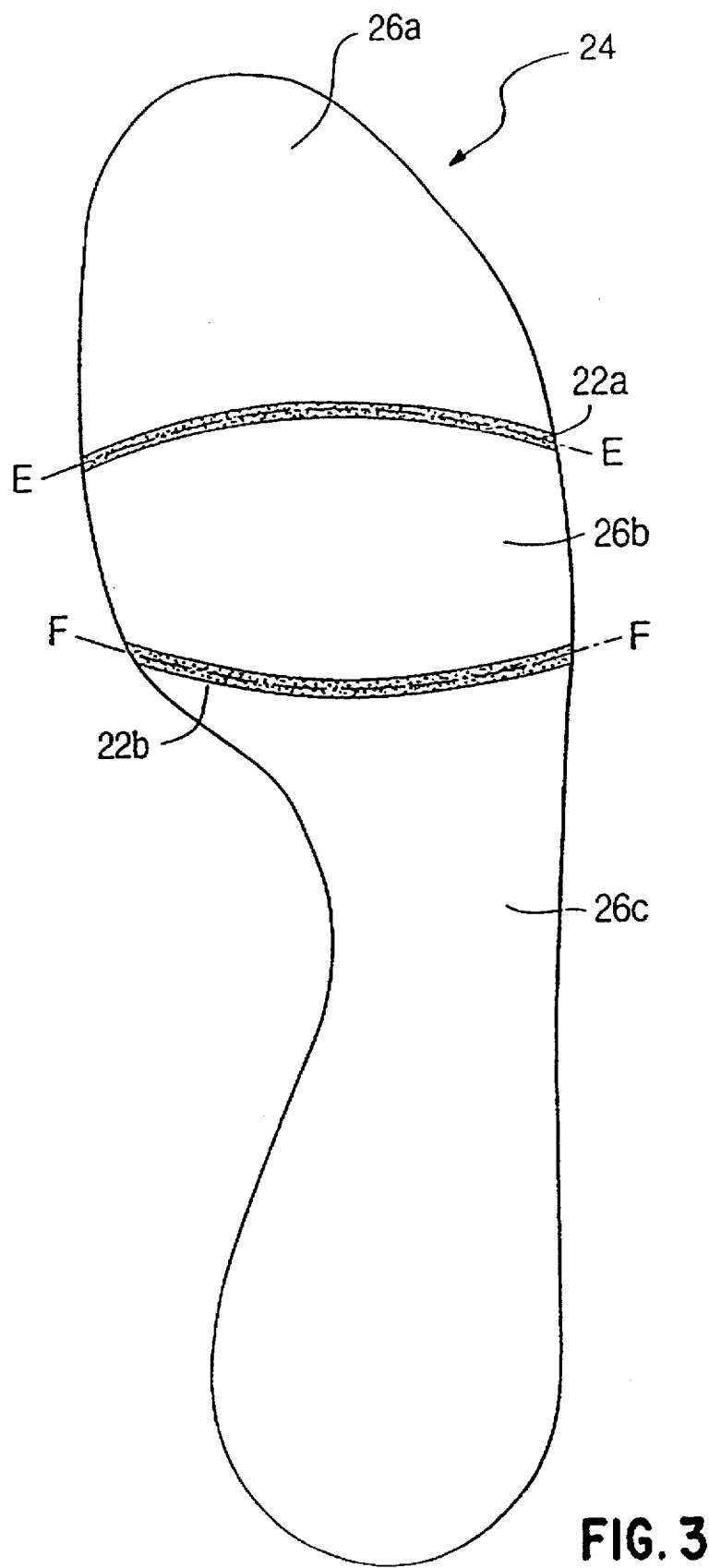
FIG. 3 is a plan view of a footwear outsole showing the use of rubber bonded to and joining three plastic outsole segments forming rubber flex lines located about and underlying the ball of the foot in the area of the forefoot.

Shown in FIG. 3 is an alternate footwear outsole 24 comprising outsole segments 26 a–c of a plastic material with rubber segments 22 a and b for enhancing the flexibility of the footwear outsole 24 along select arch lines of flexion E—E and F—F, respectively. One of the advantages of this configuration is that the area of the outsole underlying the ball of the forefoot is relatively undisturbed. This can facilitate the use of an air bag (not shown), or other cushioning technology within the overlying midsole (not shown) of an article of footwear. In addition, this configuration can facilitate the incorporation of select frictional and traction characteristics to the area about the ball of the forefoot.

Figure 4A:
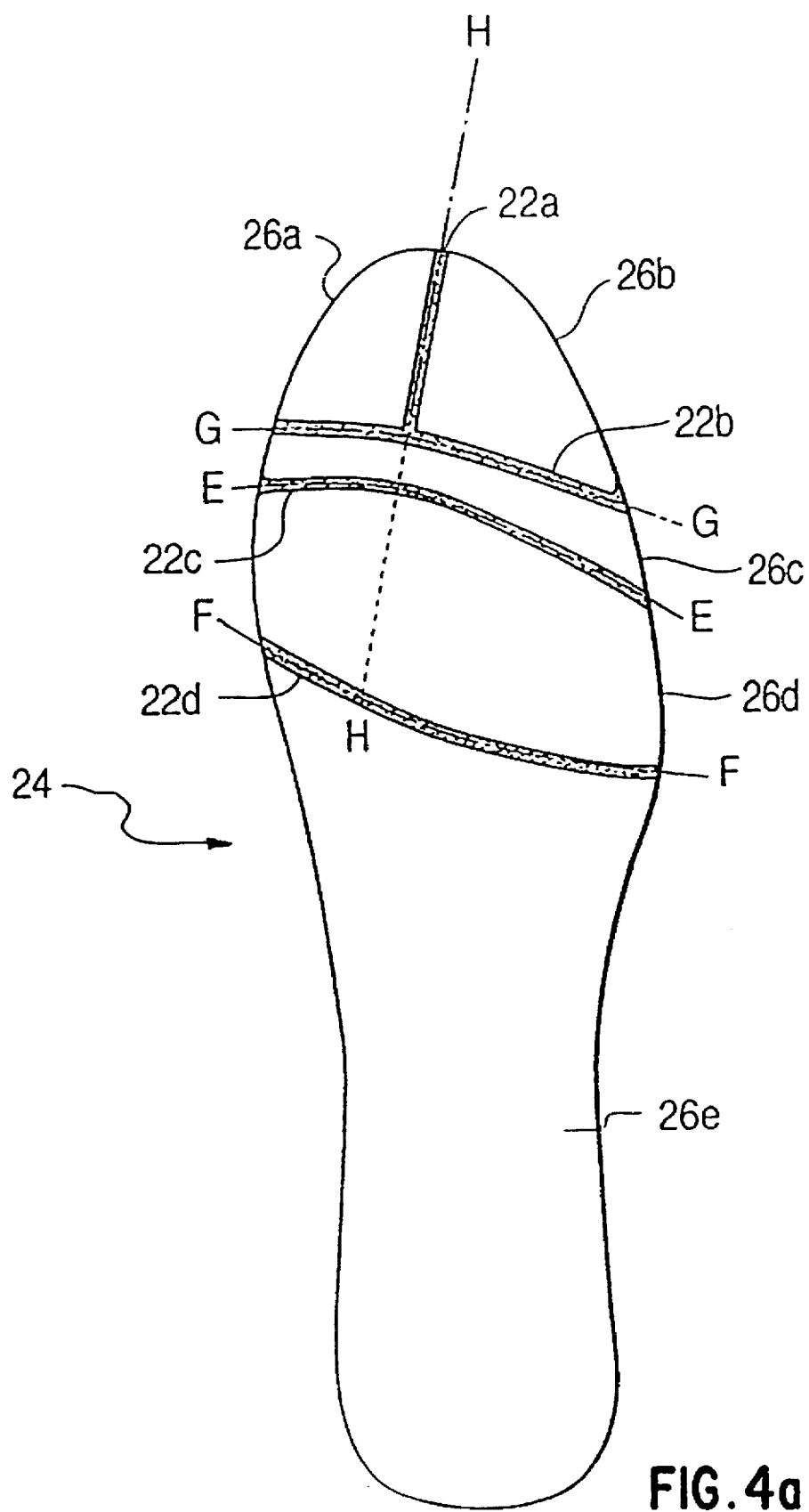
FIG. 4a is a plan view of a footwear outsole plate located about and underlying the forefoot showing rubber bonded to and joining adjacent plastic outsole segments forming rubber flex lines about both the medial-to-lateral or transverse axis and the anterior-to-posterior or longitudinal axis.
Figure 4B:
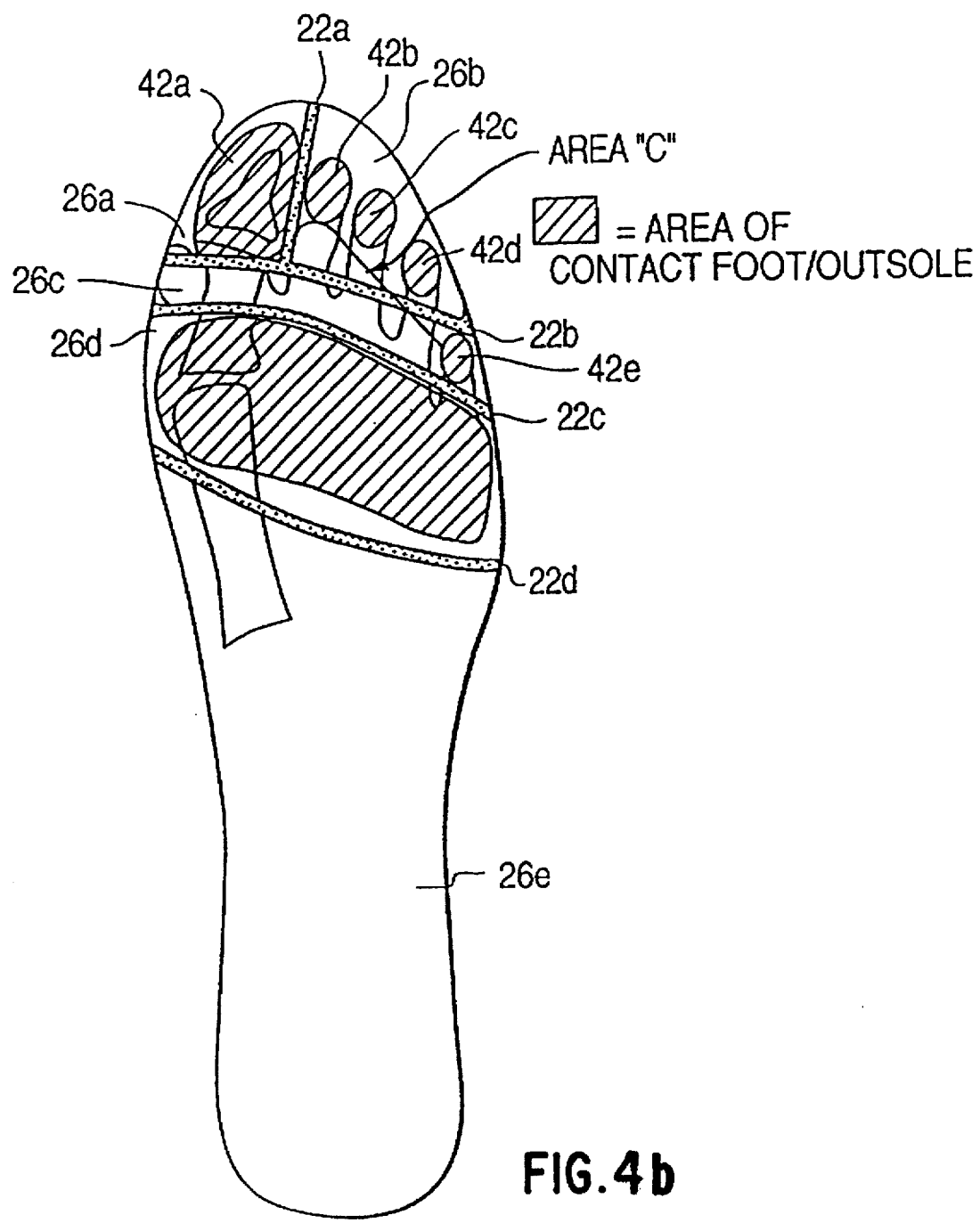
FIG. 4b is like FIG. 4a and further shows the areas of contact of the forefoot above the outsole depicted.
Figure 4C:
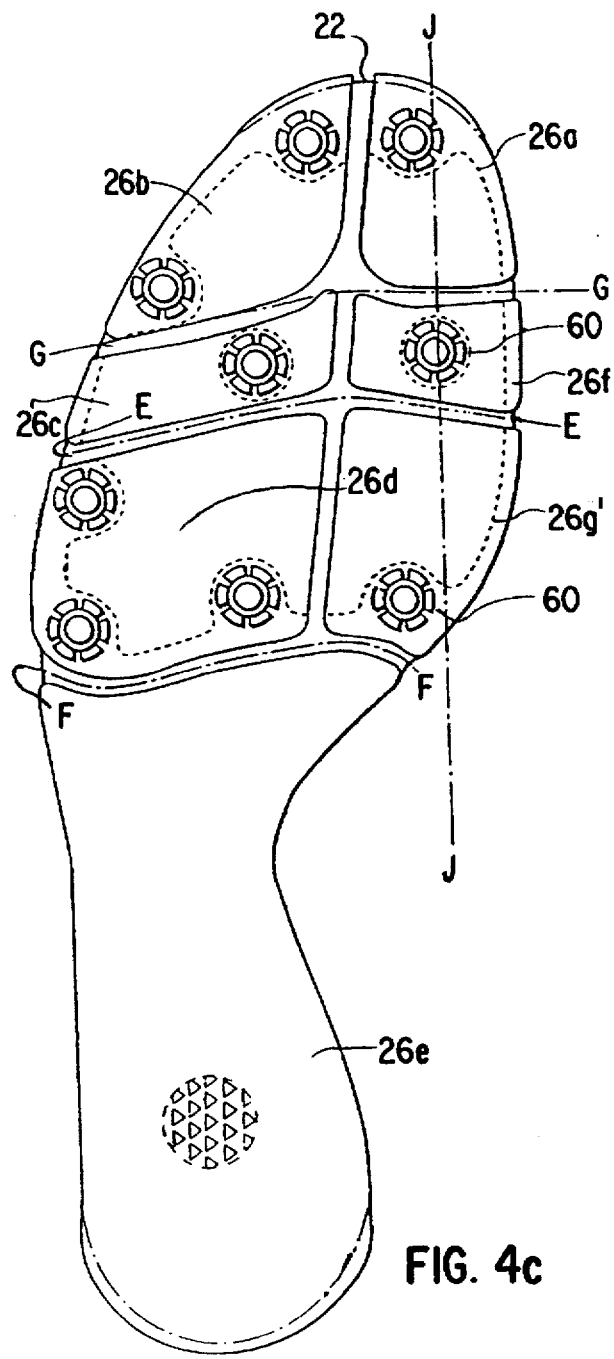
FIG. 4c is a plan view of an alternate embodiment of a footwear outsole plate similar to that shown in FIGS. 4a and b.

Shown in FIGS. 4a and b is an alternate footwear outsole 24 having outsole segments 26a–d of a plastic material underlying the forefoot and an outsole segment 26e being of either a rubber or plastic material. The outsole segments 26a–e which are chemically bonded to rubber segments 22a–d which lay along desired arch lines of flexion E—E, F—F and G—G, and line H—H. The desired lines of flexion indicated by arch lines E—E and G—G permit enhanced plantar flexion and dorsi flexion of the phalanges and corresponding digits or toes 42 a–e of a wearer's foot. This can facilitate enhanced performance in the sprinting events conducted in track and field and other speed orientated activities, or those activities in which agility is a requirement. Further, the desired line of flexion indicated by line H—H facilitates independent flexion of the medial and hteral digits or toes 42a, 42b, 42c, 42d, and 42e of the wearer's foot about the longitudinal axis, and in particular, the hallucis longus or first toe 42a with respect to the second 42b, third 42c, fourth 42d, and fifth 42e toes of the foot. It can be readily understood that the flexion afforded by line H—H could possibly be enhanced by further segmenting outsole segments 26c and 26d to provide additional outsole segments, for example, outsole segments 26f and 26f as shown in FIG. 4c, accordingly. Further, a plurality of additional outsole segments (not shown) substantially parallel to the longitudinal axis or line H—H, could be used in accord with the teachings of the present embodiment. In addition, segment 26c shown in FIGS. 4a and 4b could be deleted and a continuous portion of rubber be used between arch lines of flexion G—G and E—E. Likewise, segments 26c and 26f shown in FIG. 4c could be deleted and rubber substituted in their place. By permitting more extensive and independent use of toes 42a–e of the foot, a wearer can enjoy greater relative stability in an article of footwear incorporating such an outsole 24. The barefoot condition is known to be associated with the lowest pronation and supination scores obtained during rearfoot motion analysis. Within conventional footwear constructions, the toes 42a–e of the foot articulate within the confines of a relatively inflexible article of footwear. Insofar as the shoe upper fits snugly about the forefoot, then little room exists for the toes 42a–e to fully articulate. If more room is given for the toes 42a–e to articulate, then stability can become a problem as the foot may then slide about within the article of footwear, a sort of "Catch-22," or no-win situation. The main problem is that the wearer's foot must attempt to articulate and stabilize itself in relation to the platform provided by way of the insole (not shown), midsole (not shown), and outsole 24 of an article of footwear. This platform is commonly relatively inflexible with respect to plantar flexion and dorsi flexion of toes 42a–e and respective metatarsalphalangeal joints, but even more so with respect to like independent movement of medial and lateral portions of the ball and toes 42a–e found in the forefoot. In sum, as a result of the homogenous and monolithic construction of conventional articles of footwear, and in particular, in the area of the forefoot, the natural abilities and capacities of the human foot can suffer undue limitation. Further, the presence of rubber material and direct communication with plastic outsole plate segments can serve to dampen shock and vibration caused by impact with a give supporting surface. For example, the artificial surfaces for running used in some track and field facilities can be quite hard. In particular, the boards in the jumping events are of a reinforced and hardened wood construction and the impacts associated with competition generate high levels of shock and vibration.

Figure 4D:
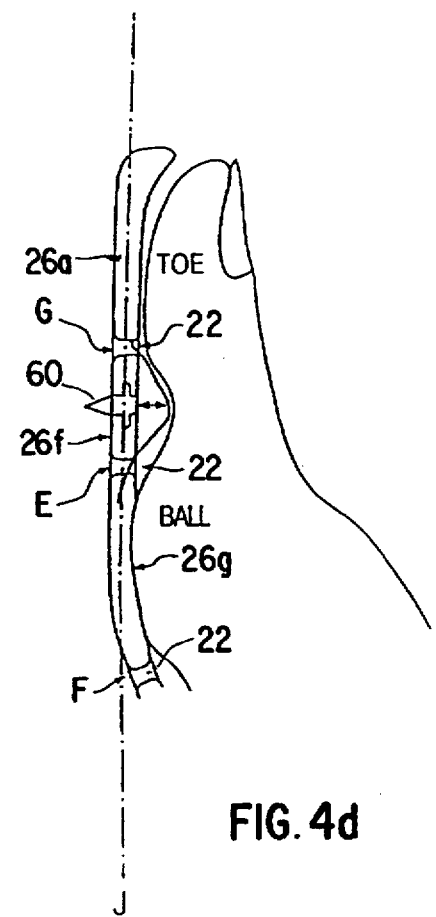
FIG. 4d is a cross-sectional view of the outsole plate shown in FIG. 4c along line J—J.

In addition, referring to FIG. 4c, please note that plastic outsole segments 26c and f can include at least one permanent, or removable traction element 60. As shown in FIG. 4c and cross-sectional view in FIG. 4d, plastic plate segment 26f, like 26c, is substantially surrounded by rubber material 22. The plantar surfaces of the foot, as shown in FIG. 4b, do not make substantial contact or impose high loads upon plastic outsole segments 26c, nor plastic outsole segments 26c and 26f as shown in FIGS. 4c and d. Therefore, when the forefoot loads the larger spike plate shown in FIGS. 4c and d, a permanent projection, or removable traction element 60 can cause plastic outsole segment 26f, and the like to be deflected vertically towards the wearer's foot in the area devoid of substantial plantar contact and support, as indicated by area "C" in FIG. 4b. The rubber surrounding plastic outsole segment 26f is thereby placed in tension, and upon removal of the load will return segment 26f to its initial relatively planar orientation.

However, as the forefoot loads the outsole spike plate during the support phase, and in particular during the propulsion phase of the running cycle, at least one of the toes 42a–e of the wearer's foot can grip the plastic outsole segment 26f posterior to toes 42a–e which has been momentarily deflected upwards. A grip or supporting surface is thereby provided against which the toes can perform useful work regarding the desired tasks of propelling the wearer (e.g. athlete) forward, but also balancing and stabilizing the foot. This embodiment would be primarily intended for possible application in sprinting and field events contested in track and field.

It can be readily understood that other means and methods can be applied to the shoe upper, insole, midsole, and outsole 24, and the like, to enhance the flexibility of articles of footwear in keeping with the melting of this embodiment of the present invention.

Figure 5:
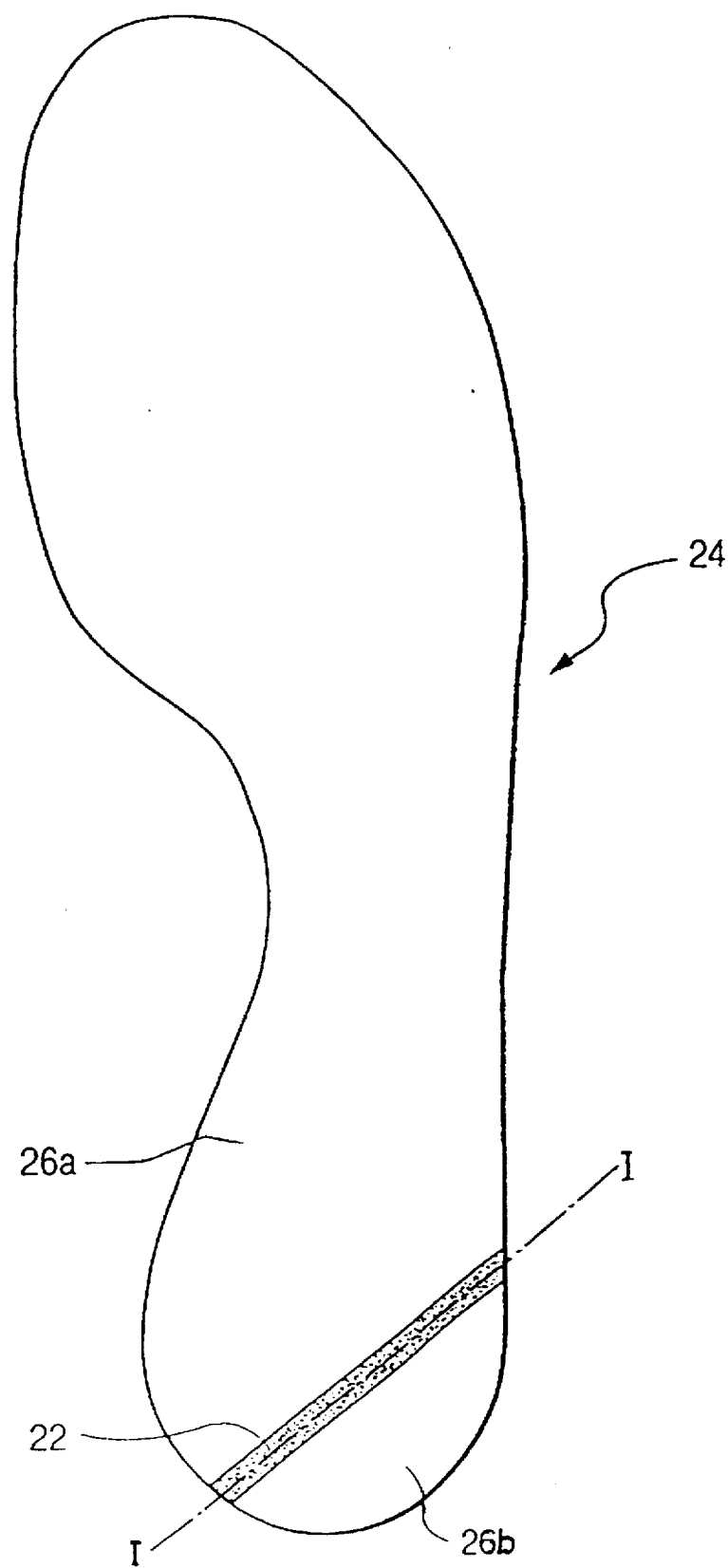
FIG. 5 is a plan view of a footwear outsole plate showing rubber bonded to adjacent plastic outsole segments located in the area about and underlying the heel of the foot forming a rubber flex line along line I—I therebetween, one of the segments generally corresponding to the rearfoot strike zone.

Shown in FIG. 5 is an another embodiment of an outsole 24 according to the present invention. The outsole 24 comprises outsole segments 26a and b of a plastic material and rubber segment 22 bonded to outsole segments 26a and b for enhancing the flexibility of the footwear outsole 24 along a select line of flexion I—I corresponding to the rearfoot strike zone (i.e., the area of initial contact with the ground for a user characterized as a rearfoot striker), of an article of footwear. This configuration can enhance cushioning and stability when the relevant stiffness of the cushioning materials used in select areas of the overlying midsoles are selectively coordinated. In particular, the stiffness of the cushioning material or device used in segment 26b should be reduced relative to that used in segment 26a. Further, the mobility of segment 26b serves to effectively decrease the rear foot angle and the length of a lever arm which can contribute to pronation.

Figure 6:
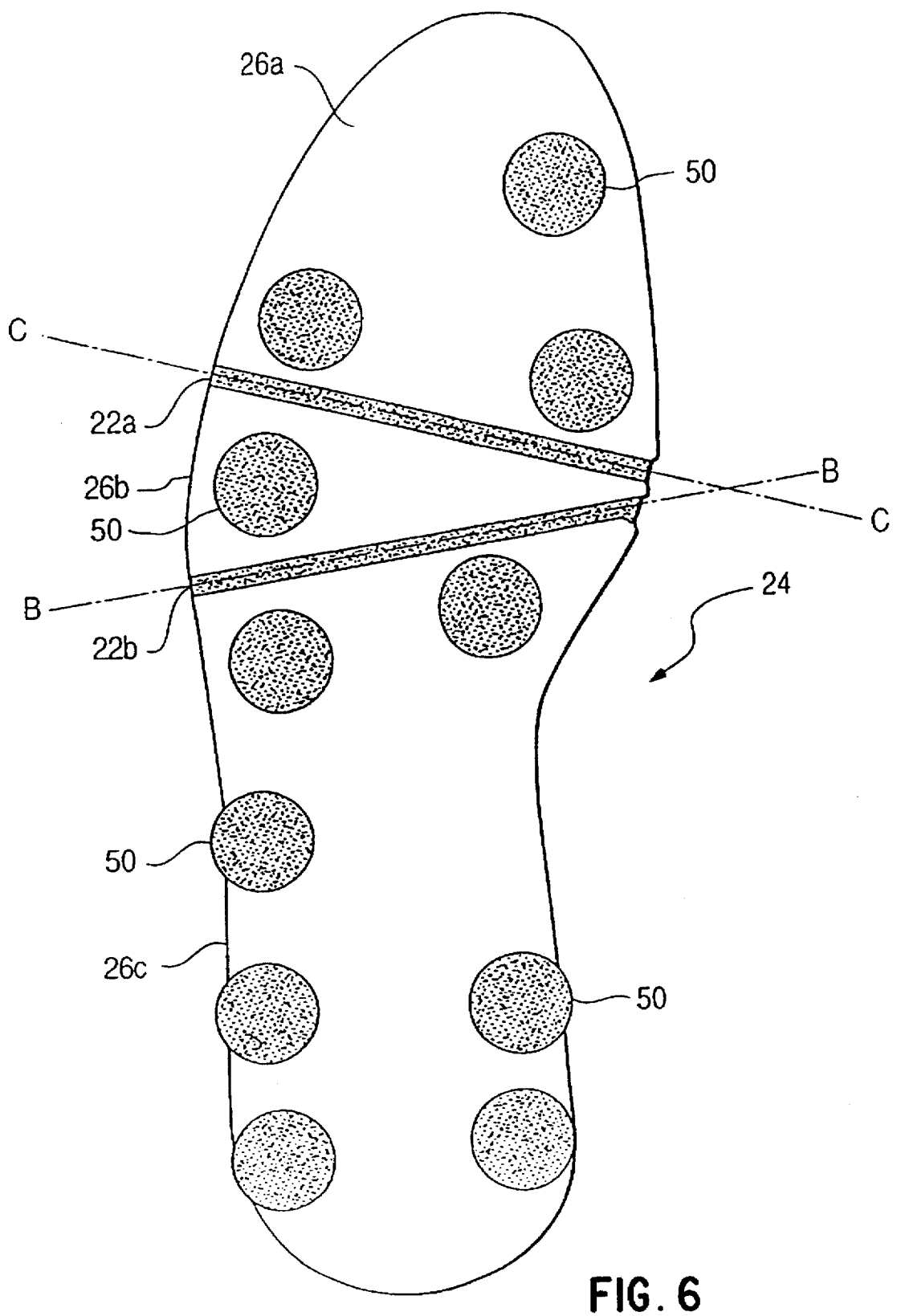
FIG. 6 is a plan view of a footwear outsole showing rubber cleats, or traction elements bonded to plastic elements of a footwear outsole and v-shaped rubber flex lines along lines B—B and C—C.

Shown in FIG. 6 are a plurality of traction elements 50 substantially comprising rubber material which have been chemically bonded to three outsole segments 26a–c of a footwear outsole 24 which substantially comprise a plastic material. In addition, the three outsole segments 26a–c are similarly connected by rubber segments 22a and b in accordance with desired lines of flexion B—B and C—C as shown in FIG. 1.

Figure 7:
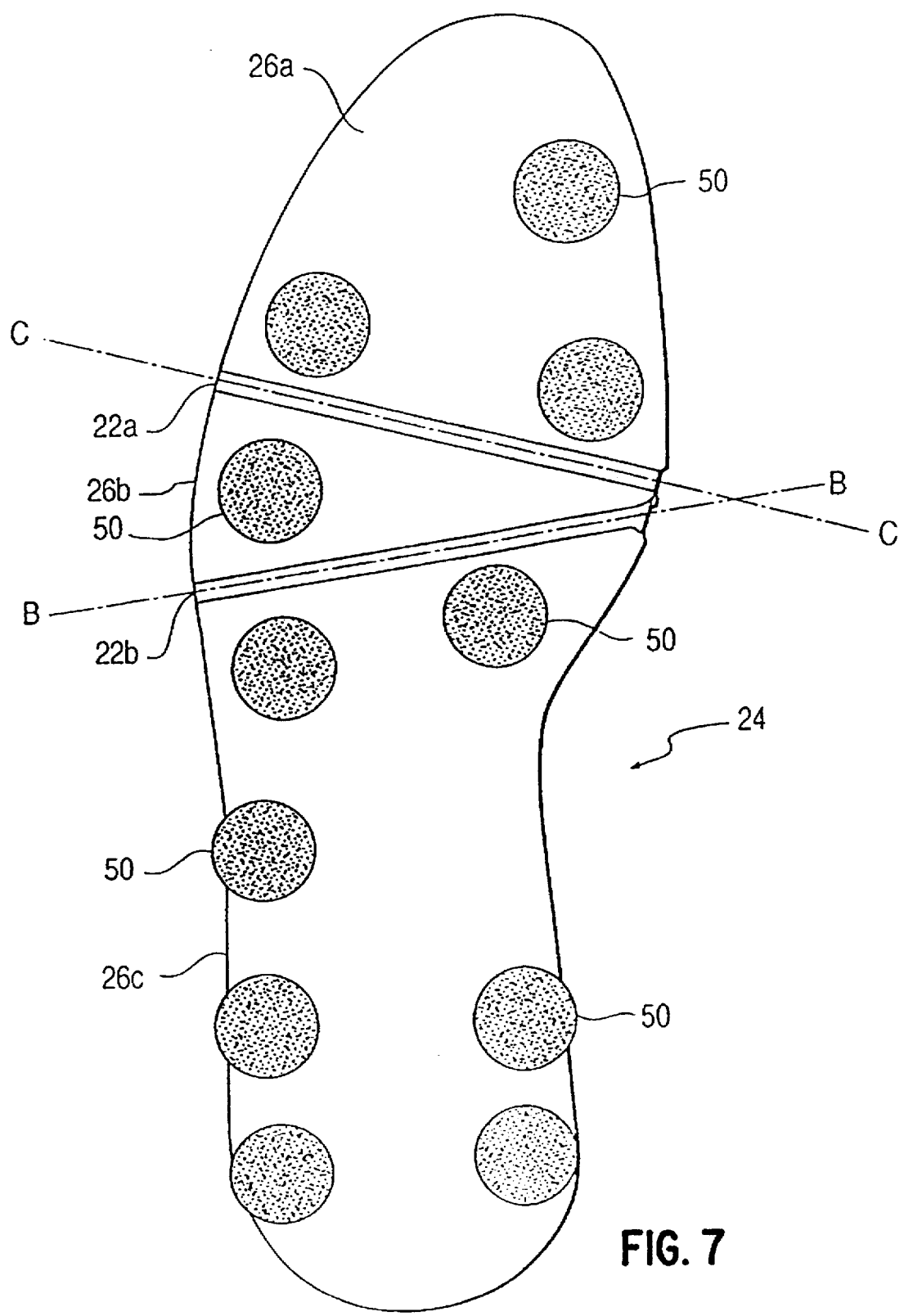
FIG. 7 is a plan view of a footwear outsole showing plastic cleats, or traction element bonded to rubber elements of a footwear outsole and v-shaped plastic flex lines along lines B—B and C—C.

Shown in FIG. 7 are a plurality of traction elements 50 substantially comprising plastic material which have been chemically bonded to three outsole segments 26a–c of a footwear outsole 24 which substantially comprise a rubber material. In addition, the outsole segments 26a–c are connected by segments 22a and b in accordance with desired lines of flexion B—B and C—C as shown in FIG. 1. Segments 22a and b may be of a plastic material, or alternatively of a rubber material which is preferably more flexible than that used in outsole segments 26a–c.

Figure 8:
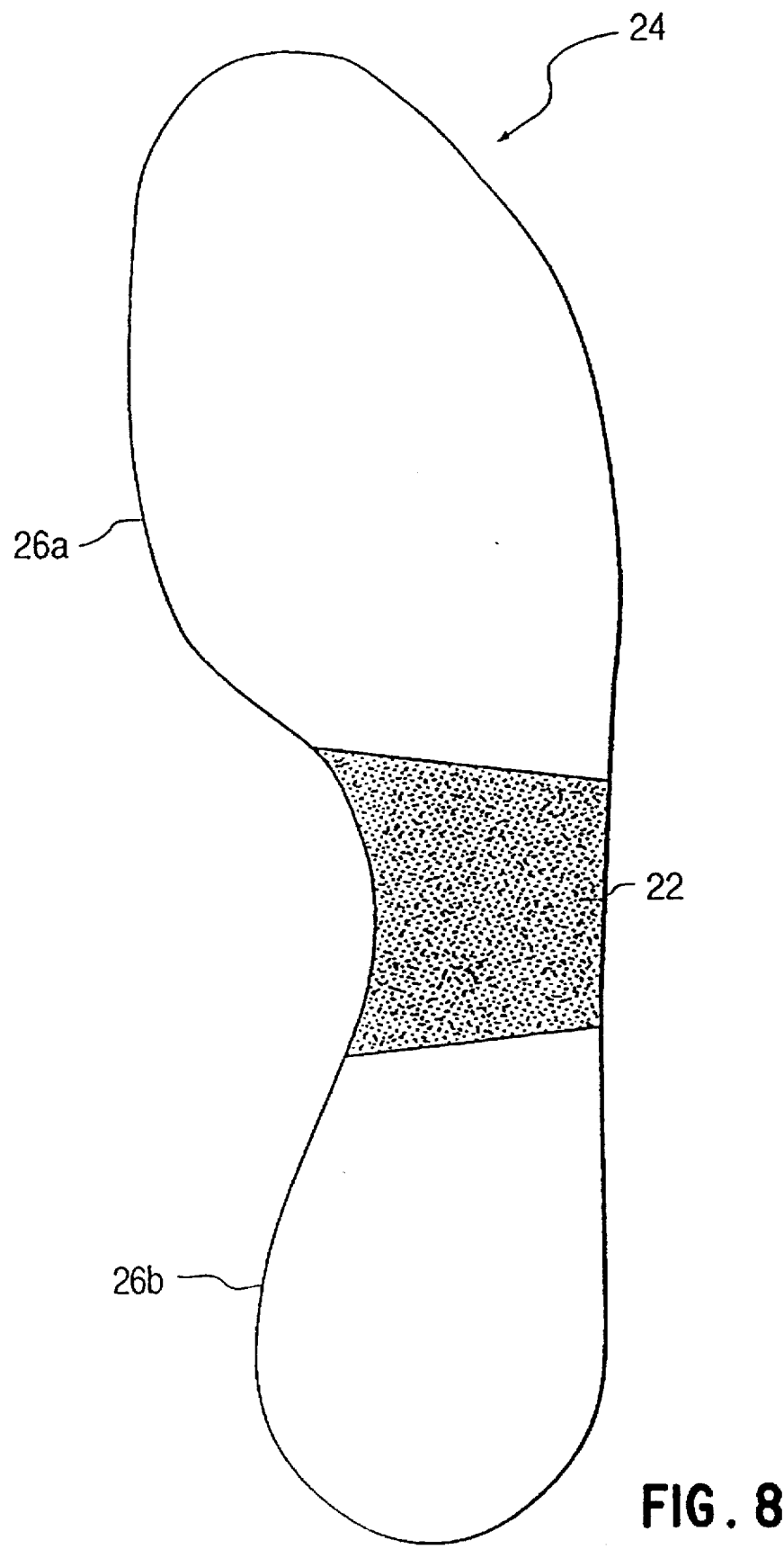
FIG. 8 is a plan view of a footwear outsole showing a rubber segment located in the area about and underlying the midfoot bonded to two plastic plate portions generally corresponding to and underlying the rearfoot and forefoot areas.

The foregoing embodiments have primarily dealt with narrow rubber segments positioned along desired lines of flexion and connecting separate outsole segments. Shown in FIG. 8 is an alternate footwear outsole 24 embodiment having two outsole segments 26a and b of plastic material substantially underlying the forefoot and rearfoot areas of the foot which are chemically bonded to a rubber segment 22 which substantially underlies the area of the midfoot. This configuration permits enhanced flexibility, or torsional movement about the longitudinal axis and thereby permits greater relative independent movement between the rearfoot and forefoot.

Figure 9:
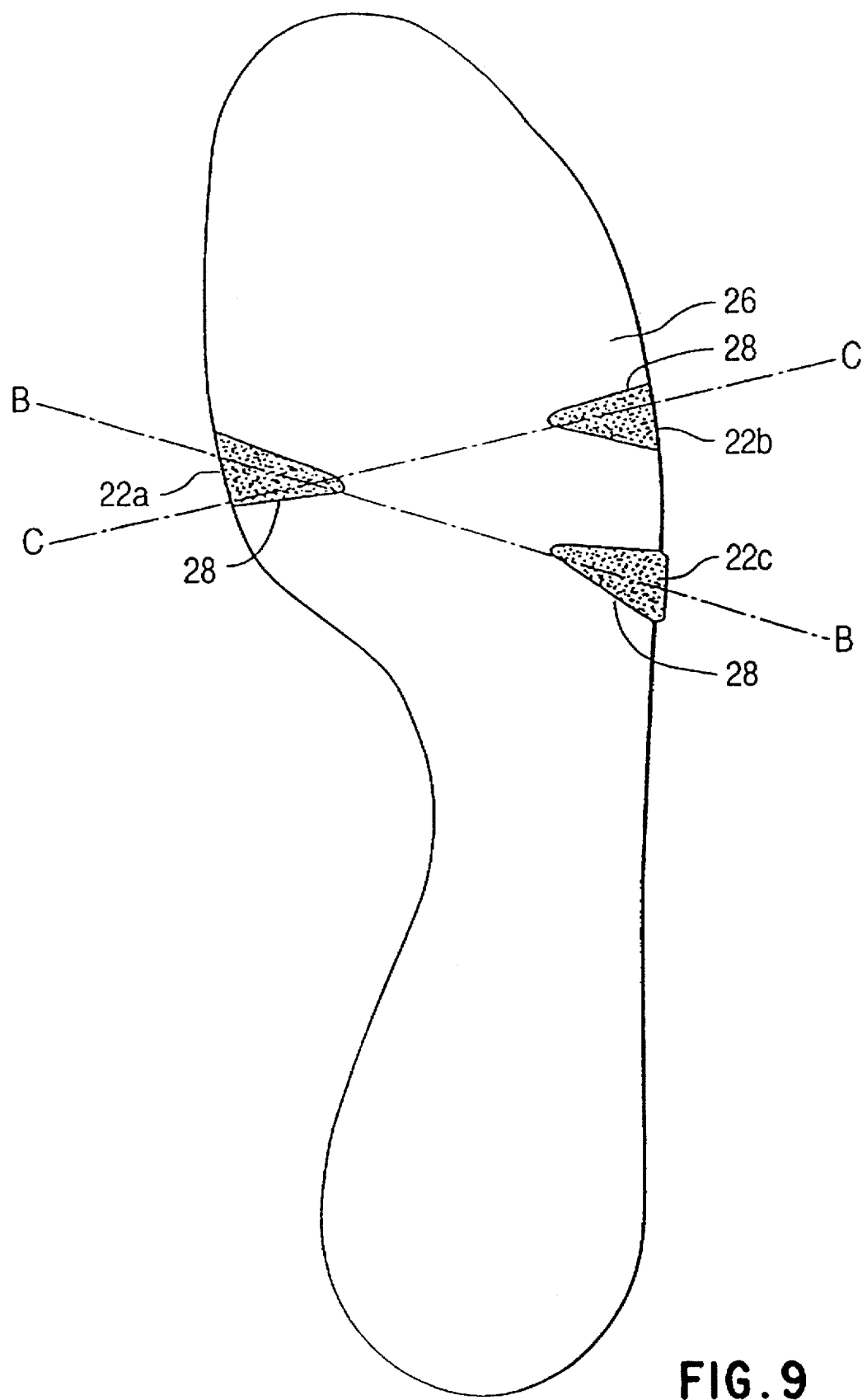
FIG. 9 is a plan view of an alternate embodiment of a "v-flex" footwear outsole showing the use of wedge-shaped rubber segments bonded to a plastic outsole at corresponding wedge-shaped notches therein so as to enhance the flexibility of the footwear outsole in at least one select area and along at least one select line of flexion such as lines B—B and C—C.
Figure 10:
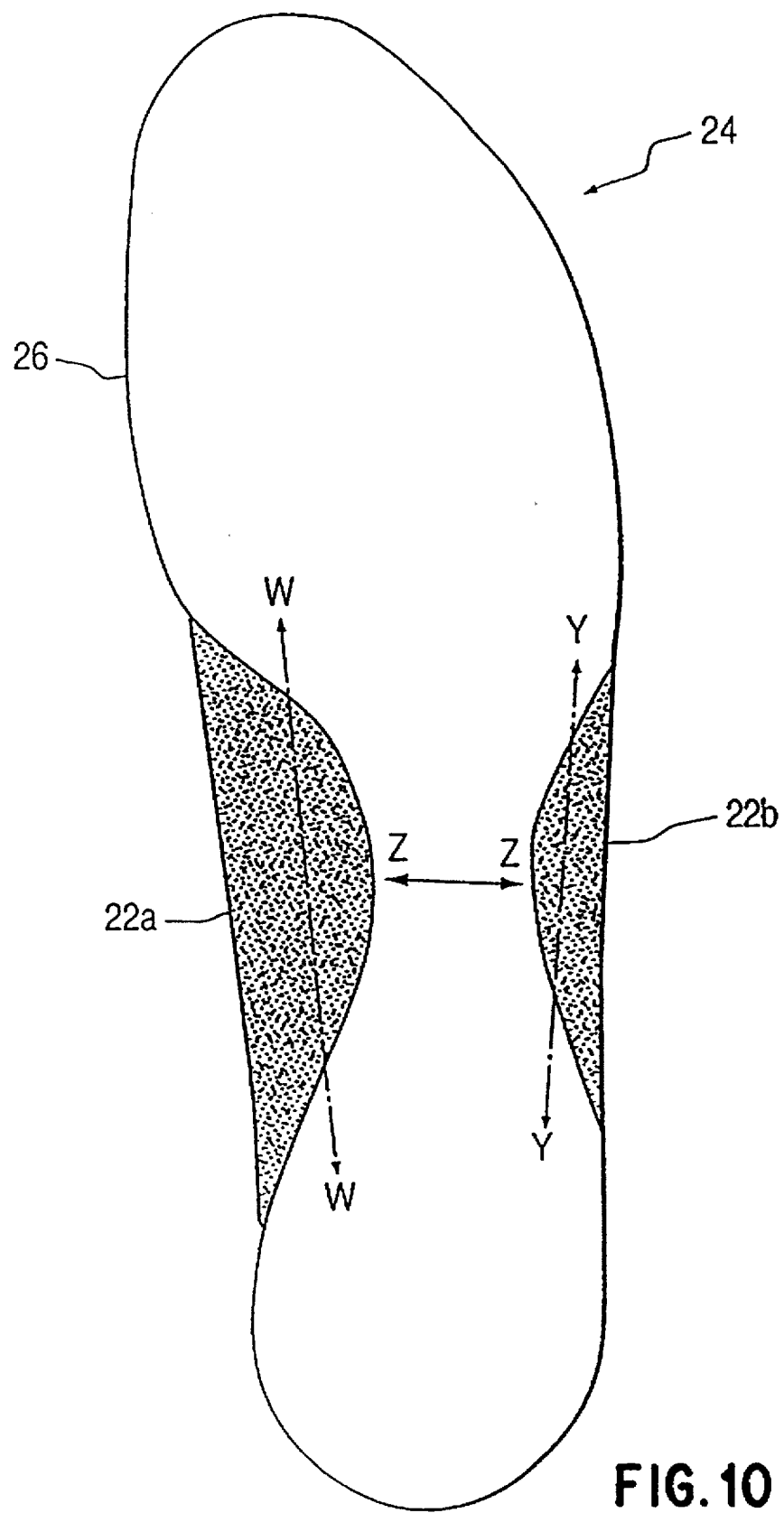
FIG. 10 is a plan view of a footwear outsole showing two segments of rubber bonded to a plastic outsole plate that are substantially located about the medial and lateral aspects of the area of the footwear outsole underlying the midfoot.
Figure 11:
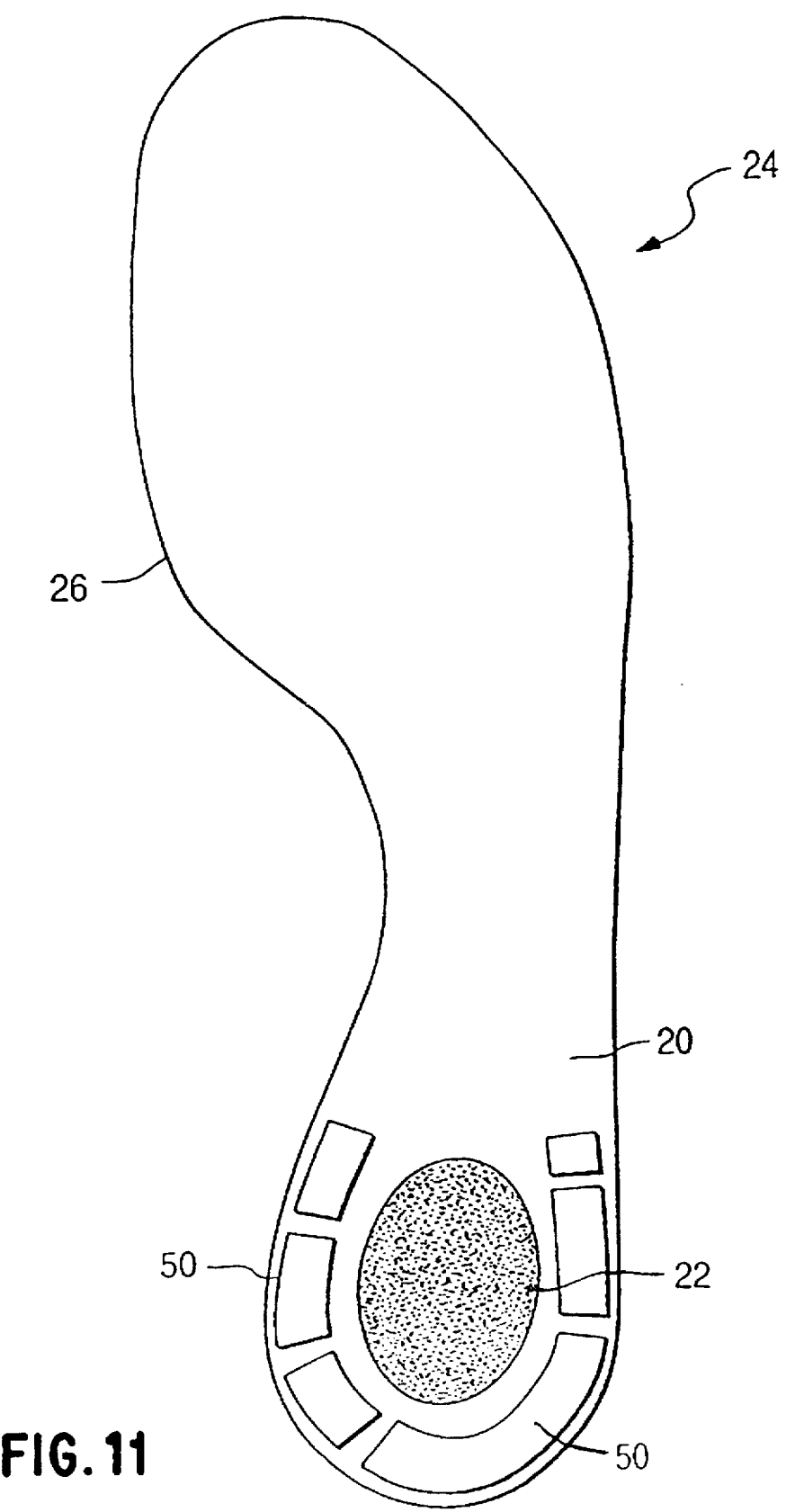
FIG. 11 is a plan view of a footwear outsole plate showing a rubber segment inserted into a corresponding void in a plastic outsole plate and bonded thereto along the perimeter of the rubber segment in the area about and underlying the calcaneus of the foot.

Furthermore, in FIGS. 9–11, rather than bonding together separate outsole segments, rubber segments 22 are bonded to an outsole plate 26 to provide the desired flexibility.

In FIG. 9, there is shown an another embodiment of footwear outsole 24. The outsole 24 comprises an outsole plate 26 of a plastic material with rubber segments 22a–c having a wedge-shape chemically bonded to desired void areas, e.g. v-shaped notches 28, of the outsole plate 26 for enhancing the flexibility of the footwear outsole 24 along select lines of flexion B—B and C—C. Alternatively, it can be readily understood that rubber segments 22 need not fully fill the voids in the outsole plate 26 to achieve different degrees of flexibility. In addition, the "v-shaped" notches 28, and the like, can extend partially, or substantially across at least one portion of the outsole plate 26. Moreover, it can be readily understood that the select use of rubber material and plastic material in a foot-wear outsole 24 can be configured so as to additionally comprise traction means.

Shown in FIG. 10 is another embodiment of an outsole 24. The outsole 26 comprises an outsole plate 26 of plastic material having rubber segments 22a and b chemically bonded in two portions to medial and lateral areas underlying the midfoot. This configuration not only enhances flexibility, or torsional movement about the longitudinal axis, but also provides support to the medial longitudinal arch (line W—W), lateral longitudinal arch (line Y—Y), and transverse arch (line Z—Z) of the foot.

Shown in FIG. 11 is another embodiment of an outsole 24. Herein, outsole 24 comprises an outsole plate 26 formed of a plastic material showing a plurality of traction elements 50 comprising a rubber material which is chemically bonded to the plastic material of the outsole plate 26. In addition, rubber segment 22 fills a void or cavity of corresponding shape in the outsole plate 26 and is chemically bonded thereto. The rubber segment 22 is located substantially in the area underlying the calcaneus of the foot for enhancing cushioning. It can be readily understood that various midsole constructions utilizing plastic materials and rubber materials in a manner consistent with the teachings disclosed in FIG. 11 are contemplated and anticipated by this embodiment of the present invention.

Figure 12:
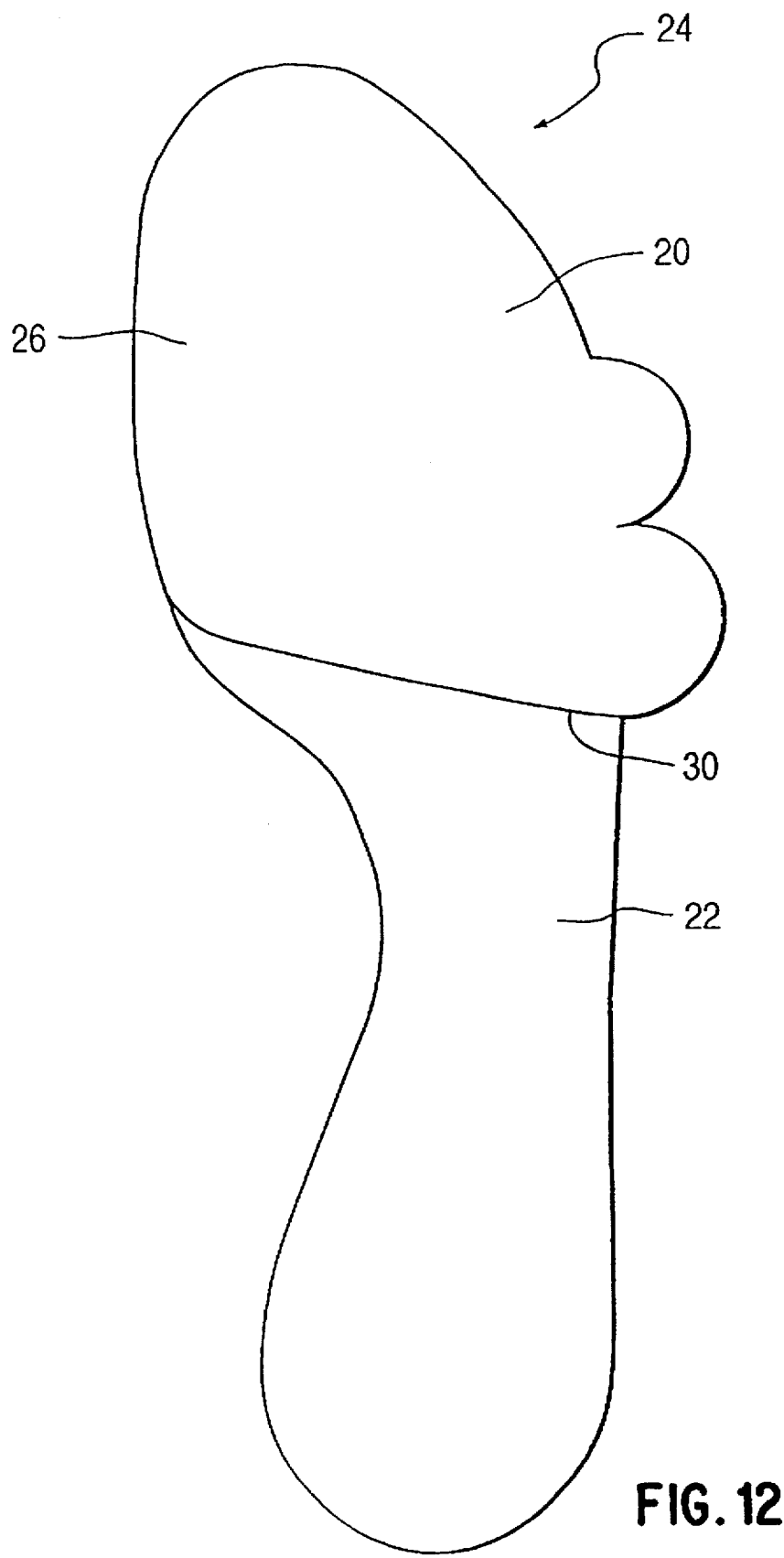
FIG. 12 is a plan view of an approximately three quarter length rubber outsole affixed to a plastic spike plate which substantially underlies the area of the forefoot.

Shown in FIG. 12 is a relatively conventional appearing footwear outsole 24 comprising two outsole plates 22 and 26. Outsole plate 26 is of a plastic material in the area underlying the forefoot. Outsole plate 22 is of a rubber material in three-quarter length. However, rather than being adhesively bonded together, outsole plates 22 and 26 have been chemically bonded to each other at their juncture 30.

Figure 13A:
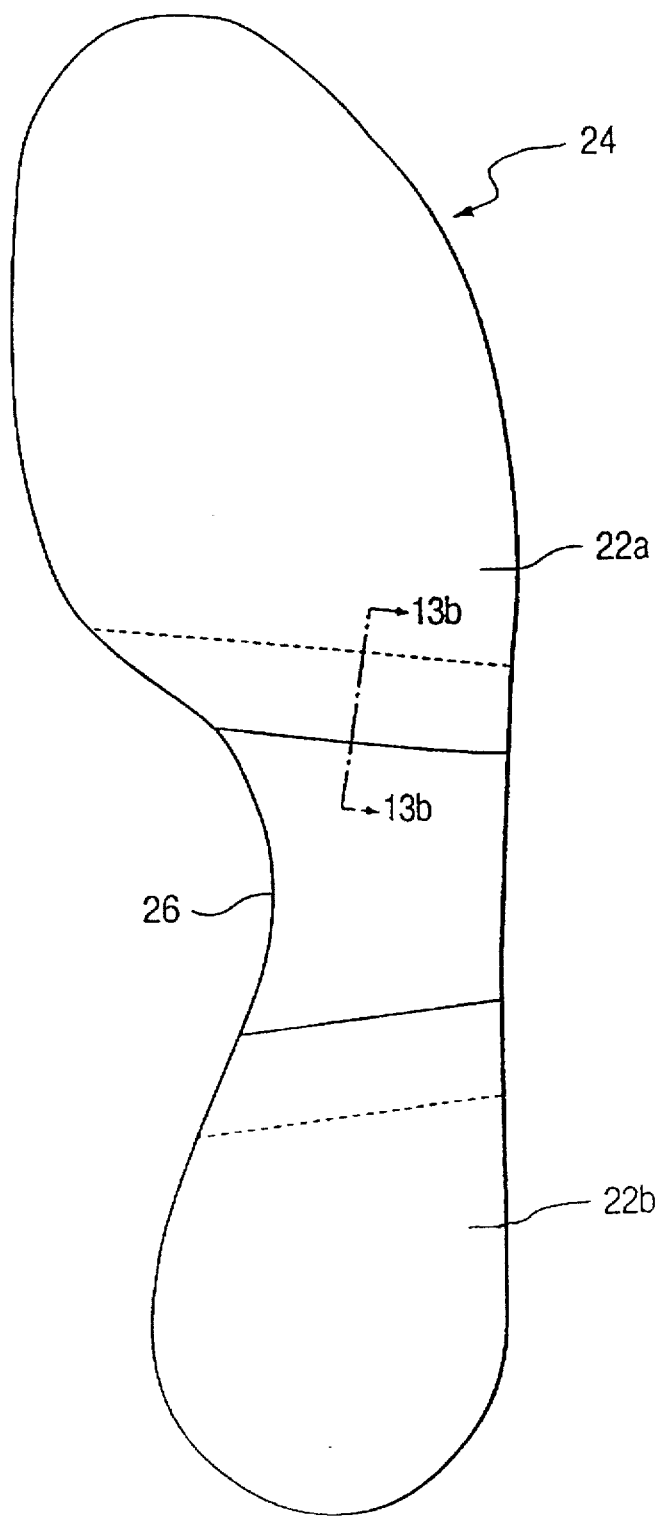
FIG. 13a is a plan view of a footwear outsole showing a plastic element located in the area about and underlying the midfoot bonded to at least two rubber outsole elements located about and underlying the area of the forefoot and rearfoot wherein the various segments have inclined surfaces to increase their respective bond surfaces.
Figure 13B:
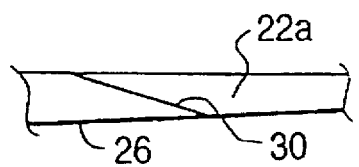
FIG. 13b is a cross-sectional view of FIG. 13a along line 13b—13b.

Shown in FIG. 13a is a footwear outsole 24 fabricated conversely to the embodiment shown in FIG. 8. The areas of the outsole 24 underlying the forefoot (outsole plate 22a) and rearfoot (outsole plate 22b) are substantially comprised of rubber material and are bridged by an outsole or moderator plate 26 comprising a plastic material which underlies the area of the midfoot. In this embodiment, the moderate plate 26 overlaps and extends at least partially over the superior surface of the outsole plates 22a and b which underlie the areas of the forefoot and rearfoot, respectively. This overlap shown in FIG. 13b relative to outsole plates 22a and 26 provides a greater surface over which to provide a chemical bond and provides a transitional area for the mechanical and elastic properties of the outsole plates 22a to 26 to 22b.

Figure 14:
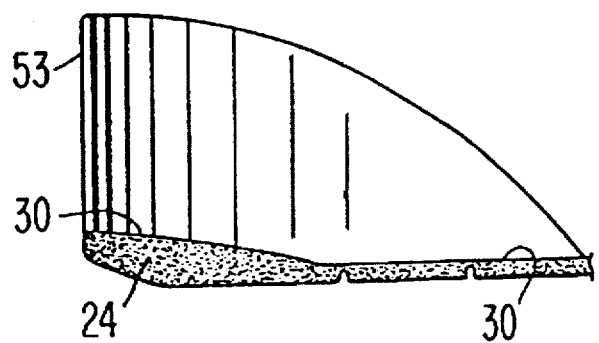
FIG. 14 is a lateral perspective view showing a plastic heel counter bonded to a rubber footwear outsole.

Shown in FIG. 14 is a portion of an outsole 24 substantially consisting of rubber material to which has been chemically bonded a heel counter 53 substantially consisting of plastic material along bond line 30 so as to form a one-piece unit. This construction is expected to enhance the stability of the heel counter 53.

Figure 15:
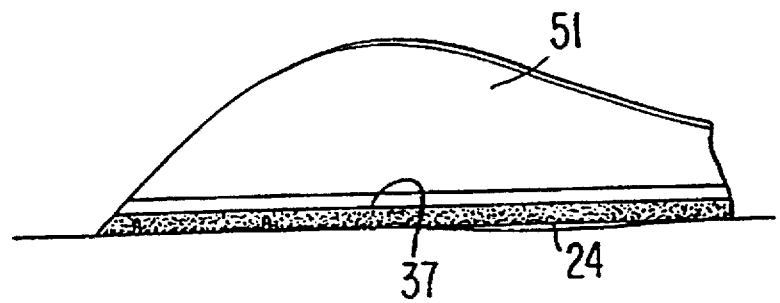
FIG. 15 is a lateral perspective view showing a plastic stability device located about the lateral aspect of the midfoot bonded to a rubber footwear outsole.

In FIG. 15, there is shown the midfoot portion of a footwear outsole 24 substantially consisting of rubber material having a hteral stability and support structure 51 substantially consisting of a plastic material chemically bonded to the footwear outsole 24 about the hteral aspect of the area of the midfoot 37. It can be readily understood that like stability and support structures can be used about the forefoot, midfoot, or rearfoot areas, whether about the medial, lateral, anterior, or posterior aspects and whether in partial or complete combination.

Figure 16:
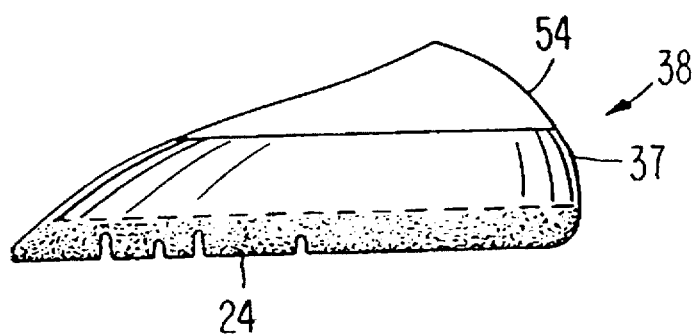
FIG. 16 is a lateral perspective view showing an elevated rubber toe wrap bonded to a rubber footwear outsole.

Shown in FIG. 16 is a portion of an article of footwear 38 having a footwear outsole 24 substantially consisting of a rubber material and having a too guard 54 substantially consisting of a plastic material chemically bonded to the outsole 24 along bond line 37. This construction can prolong footwear life by protecting the shoe upper (not shown) from excessive wear commonly experienced by users of articles of footwear, e.g., baseball pitchers or tennis players, who exhibit toe drag.

Figure 17A:
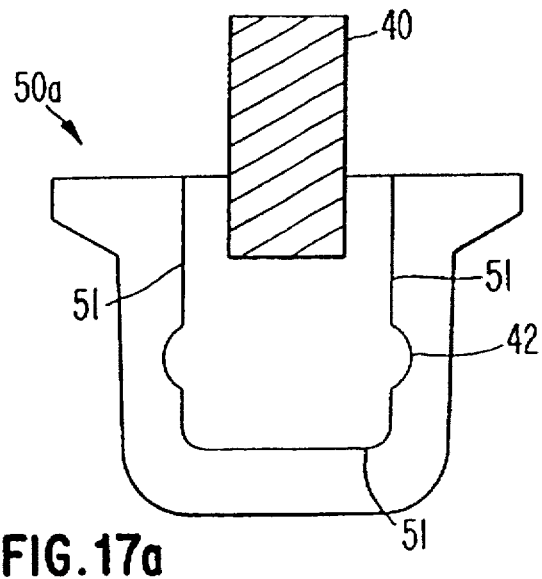
FIGS. 17a–c show cross sectional views bisecting various embodiments of a traction element for footwear showing various configurations for bonding plastic and rubber portions thereof.
Figure 17B:
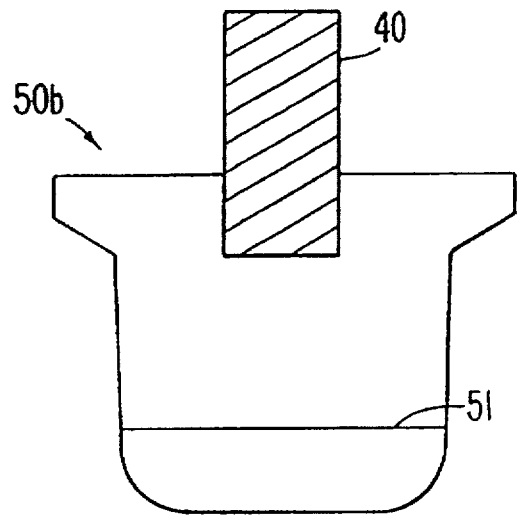
Figure 17C:
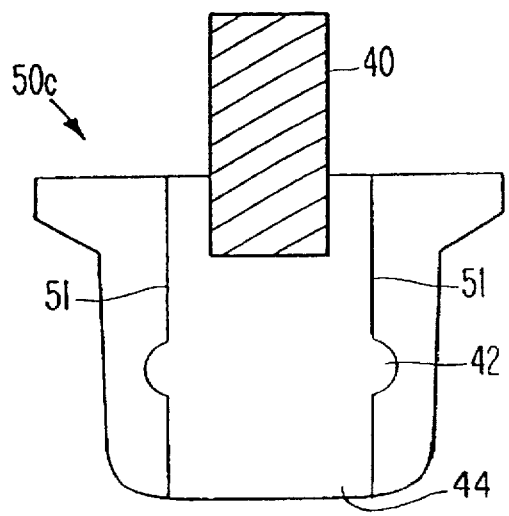

Shown in FIGS. 17a, 17b and 17c are various alternate embodiments of a removable traction element 50 and, respectively, showing but a few of the possible combinations of rubber material and plastic material which are possible and could be desired depending upon the situational demands and environmental circumstances attending the use of an article of footwear. In FIG. 17a, the removable traction element 50a comprises a threaded screw component 40. A portion of the screw component 40 is anchored to a plastic core 20. The plastic core 20 has an outer layer 22 of rubber material chemically bonded thereto on surface 51 thereof. The plastic core 20 also has a ridge portion 42 to further aid in retaining the outer layer 22 on the plastic core 20. The removable traction element 50c in FIG. 17c is like that of traction element 50a in FIG. 17a with the exception that the plastic core 20 has an exposed surface 44 opposite the screw component 40.

In FIG. 17b, the removable traction element 50b comprises a threaded screw component 40. A portion of the screw component 40 is anchored to a body portion 20 of a plastic material having a planar surface 51 perpendicular to the main axis of the screw component 40 and opposite thereto. A traction layer 22 of rubber material is chemically bonded to the planar surface 51. Alternatively, the body portion 20 may be of a rubber material and the traction layer 22 may be of a plastic material.

Figure 18:
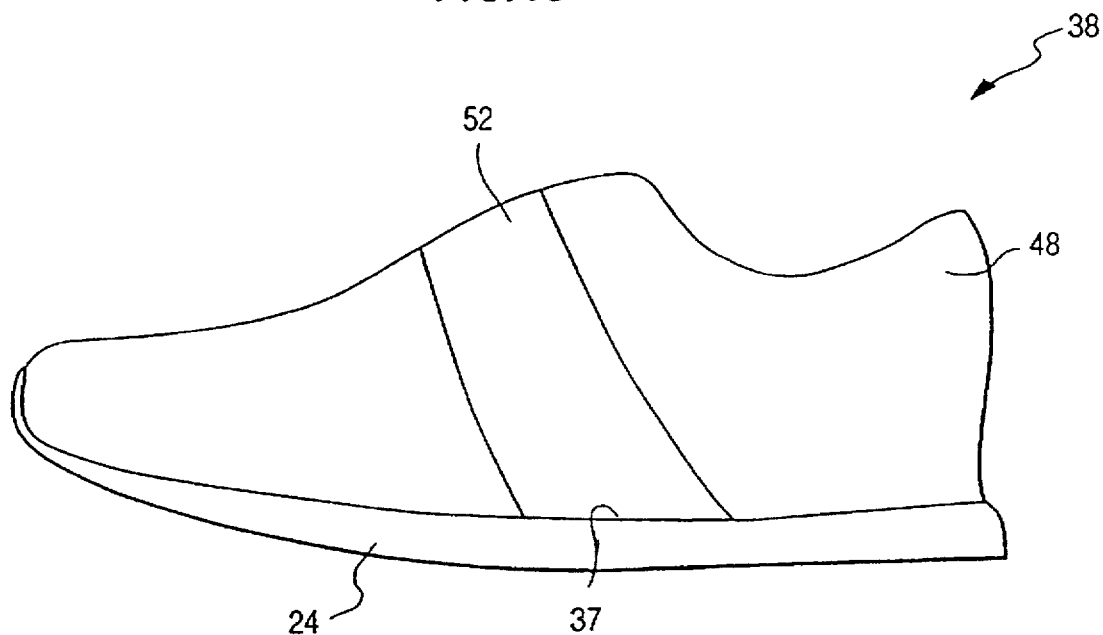
FIG. 18 is a lateral view of an article of footwear showing a plastic stability strap bonded to a rubber footwear outsole.

Shown in FIG. 18 is an article of footwear 38 having a shoe upper 48 and includes a strap 52 substantially consisting of plastic material. The strap 52 is chemically bonded to a footwear outsole 24 substantially consisting of a rubber material along line 37. Alternatively, it can be readily understood that a strap 52 consisting of rubber material can be chemically bonded to a footwear outsole 24 substantially consisting of a plastic material.

Figure 19:
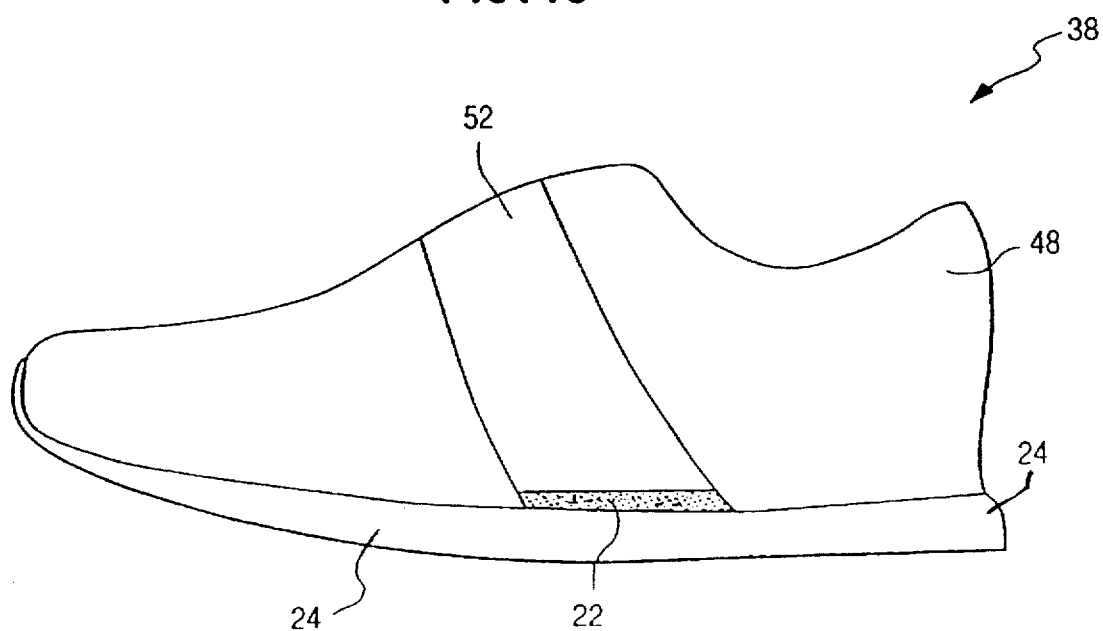
FIG. 19 is a lateral view of an article of footwear showing a plastic stability strap bonded to rubber in the area of the junction of the strap to a plastic footwear outsole.

Shown in FIG. 19 is an article of footwear 38 having a shoe upper 48 and includes a strap 52 substantially consisting of plastic material. The strap 52 is chemically bonded to a rubber strip 22 which serves as the point of origin, or anchor of the swap 52 and this rubber strip 22 portion is in turn chemically bonded to a footwear outsole 24 substantially consisting of a plastic material. This configuration permits greater articulation of the footwear swap 52 and can thereby enhance the performance of the strap 52. In addition, the elastic properties of the rubber strip 22 potion of the strap 52 can be utilized to exert a preload upon the wearer's foot when the swap 52 is tightened in such a manner as to stretch the rubber strip 22. In addition, the rubber strip 22 present in the area about the origin of the strap 52 can substantially prevent fatigue and possible failure relative to a more rigid and inelastic plastic material of strap 52.

Alternatively, in FIG. 19, the shoe-upper 48 may be comprised of plastic fibrous material. Strap 52 may be of a rubber material with area 22 deeming the area of chemical bonding of the strap 22 to shoe-upper 48. As a further alternative, strap 52 may be of plastic material chemically bonded to a rubber strip 22 which in turn is chemically bonded to the shoe-upper 48, which is comprised of a plastic fibrous material.

Shown in FIGS. 20a and b are posterior and partial lateral views, respectively, of an article of footwear 38 showing a rearfoot strap construction showing substantially lateral and medially located heel counters 53a and b substantially consisting of a plastic material chemically bonded to a support strap 52 substantially consisting of a rubber material which transits behind the posterior portion 55 of the shoe upper 48 and joins the lateral and medially located heel counters 53a and b. It can be readily understood that other like structures are contemplated for use in other portions of an article of footwear 38. Further, the anchor portions 56a, b, c, and d of heel counters 53a and b, respectively, may be chemically bonded to the sole 54 by appropriate selection of materials for the sole 54 at the point of contact.

Another embodiment of the present invention is shown in FIG. 21. In FIG. 21, a portion of a footwear strap 52 having an eyelet insert 58 for shoe laces 57 is shown. The eyelet insert 58 substantially consisting of a plastic material for the passage, or affixing, of a shoe lace 57 is chemically bonded to the strap 52. This construction, and the like can extend the wear of a footwear strap 52 and permit better fit due to the elastic nature of the rubber material utilized for the strap 52. Moreover, this construction can introduce a preload when secured by a wearer due to the elastic properties of the rubber material.

Figure 22:
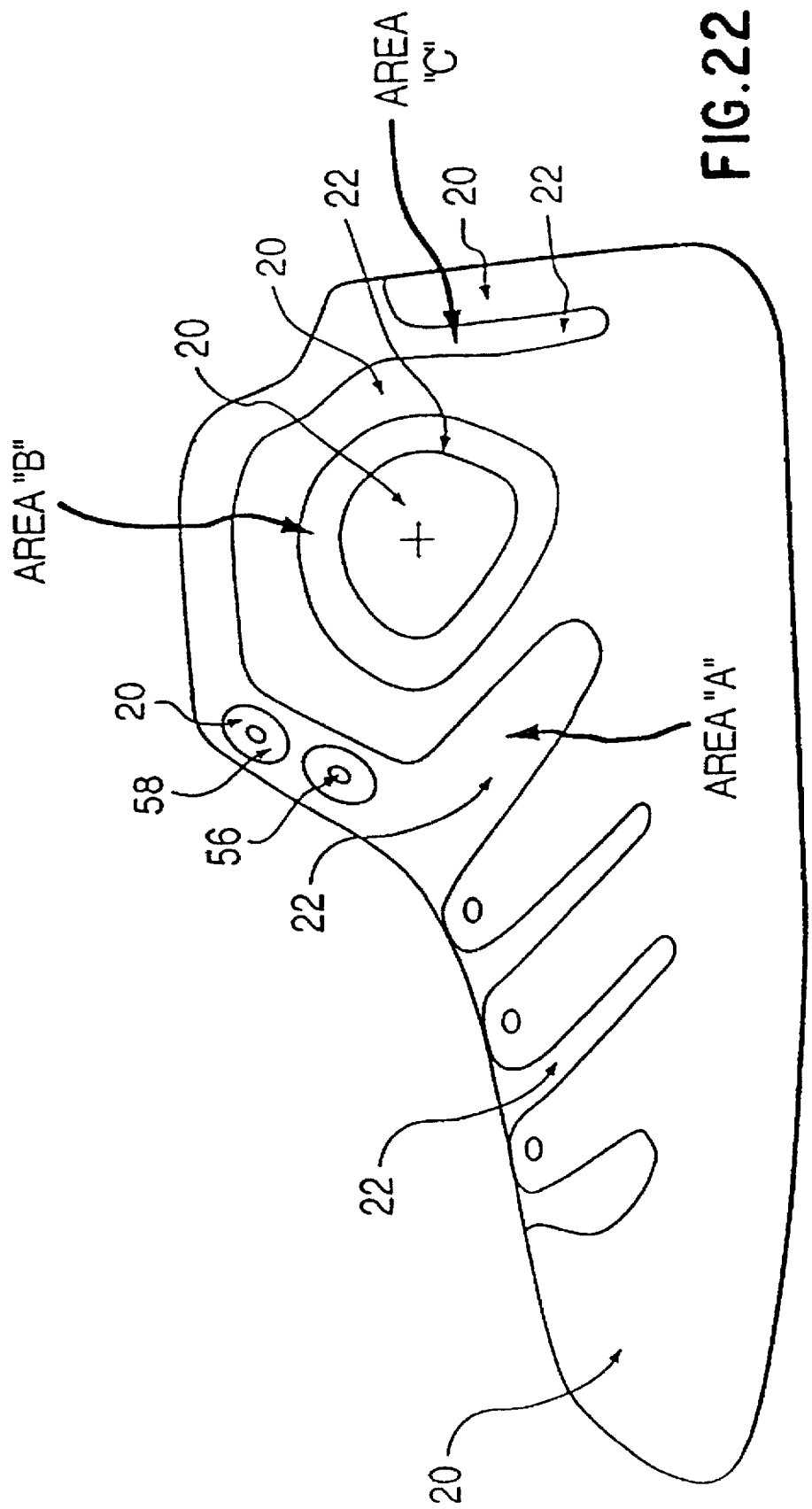
FIG. 22 is a lateral perspective view showing an articulating hockey skate boot upper.

Shown in FIG. 22 is an article of footwear 38 having an articulating shoe upper 48 substantially consisting of various segments of plastic material which are chemically bonded to rubber material which serves to align and form the various segments into a larger functional unit. This kind of construction can find application, e.g., in the footwear uppers of in-line roller skates, hockey skates or ski boots. The shoe upper 48 includes a notched area "A" substantially comprising a more flexible rubber or plastic material for permitting unrestricted plantar and dorsi flexion of the foot. Further, the shoe upper 48 includes a "floating" or semi-mobile plastic 20 malleable guard for enhancing fit in the area of the ankles "B", but without compromising protection. In addition, the posterior heal portion is recessed and includes a plastic guard which is at least partially mobile so as to permit unrestricted plantar or dorsi flexion without impenging the Achilles tendon.

Figure 23A:
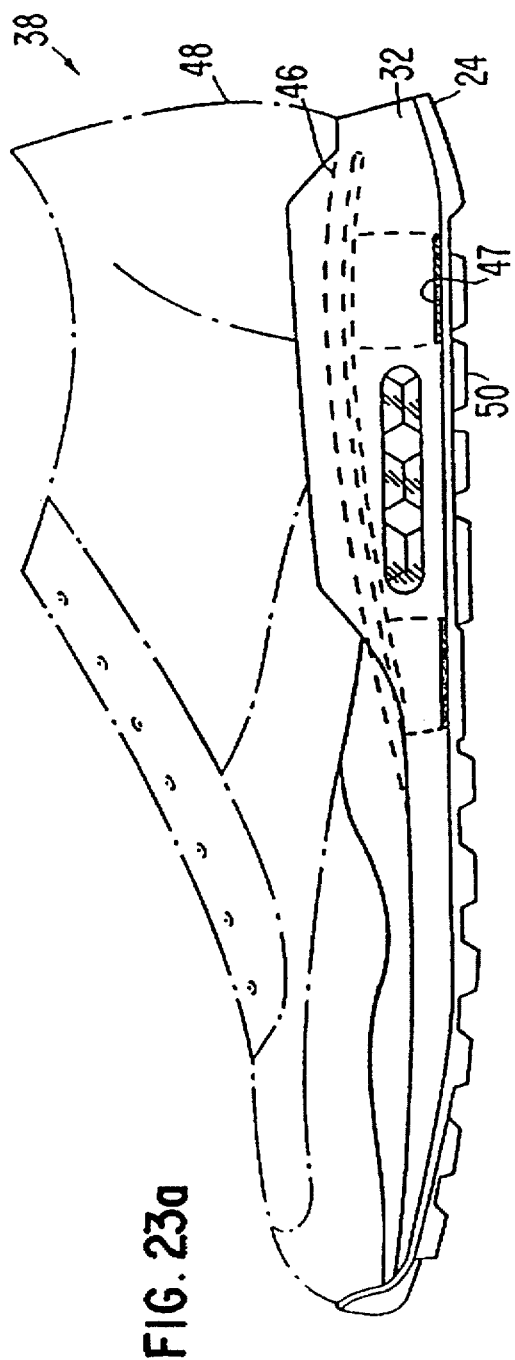
FIG. 23a and b are a lateral perspective view and a top plan view, respectively, of a plastic stability element bonded to a rubber footwear outsole member.
Figure 23B:
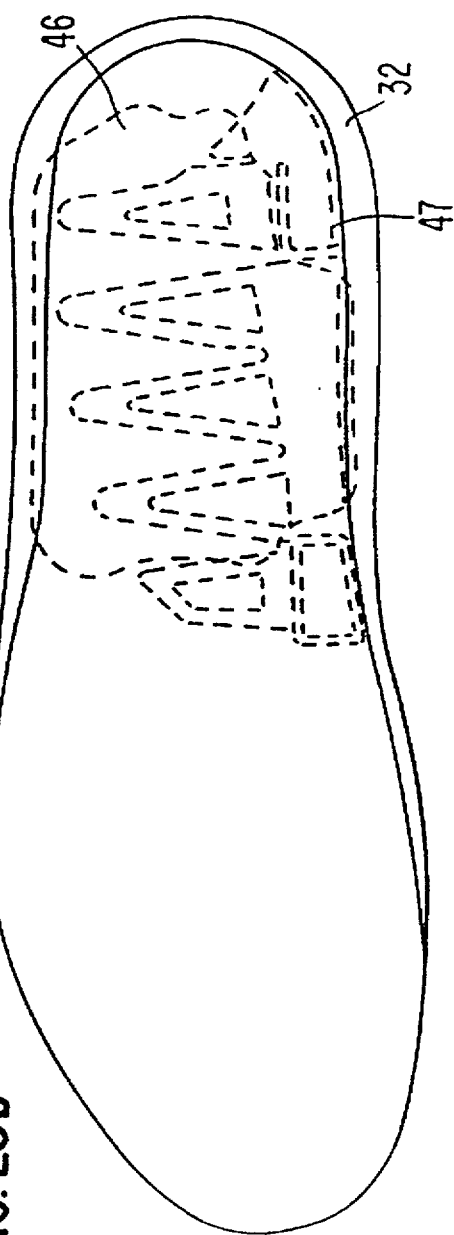

Shown in lateral view FIG. 23a and top view FIG. 23b is a stability device, e.g., a FOOTBRIDGER® (stability device) 47, comprising a plastic material which has been chemically bonded to a footwear outsole 24 substantially comprising a rubber material to form a one-piece unit.

Figure 24:
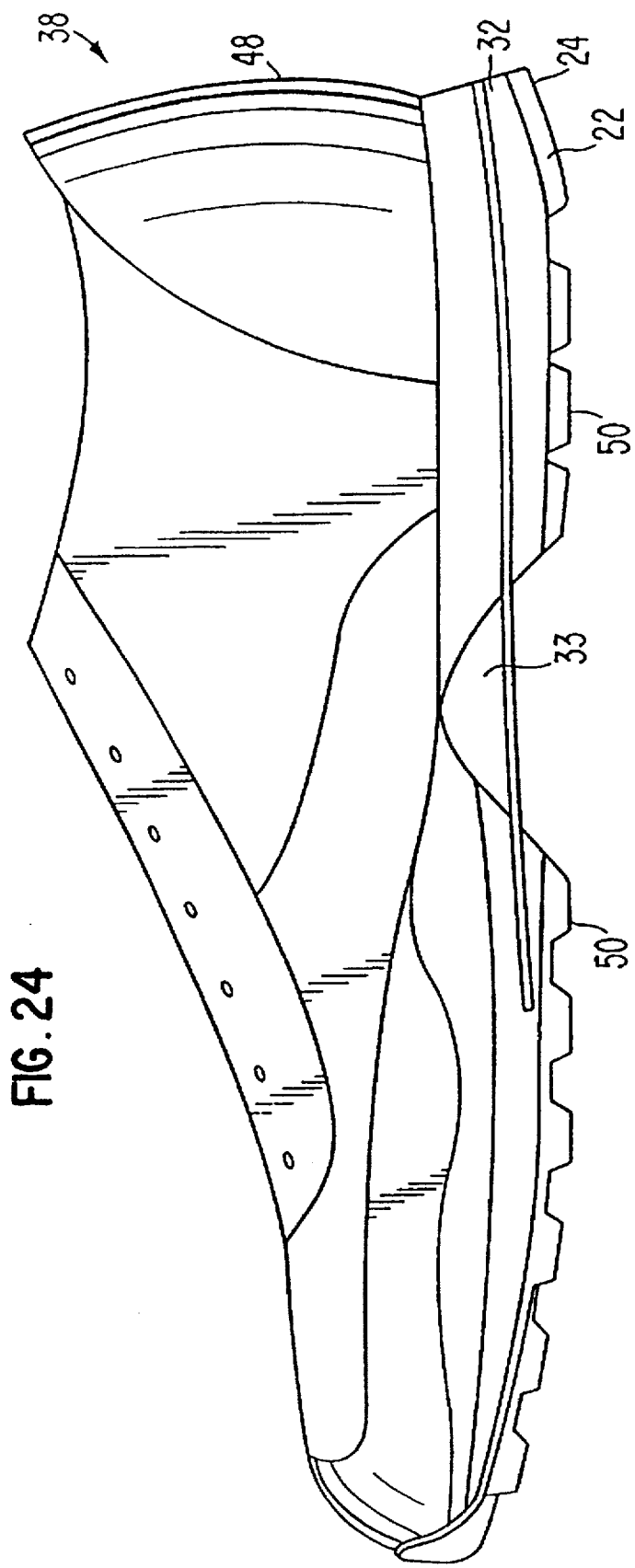
FIG. 24 is a cross-sectional view of a plastic plate which is at least partially contained within the midsole of an article of footwear bonded to a rubber footwear outsole member and to the midsole member.

Shown in FIG. 24 is a cross-sectional view along the anterior-posterior or longitudinal axis of an article of footwear 38 showing the use of a midsole moderator plate 33 comprising a plastic material which has been chemically bonded to a footwear midsole 32 substantially comprising a foamed plastic or rubber material to form a one-piece unit.

The following examples illustrate the various techniques utilized in chemically bonding chemical and rubber materials together for use in outsole for articles of footwear. Other features of the invention will become apparent in the course of the following description of exemplary embodiments which are given for modification of the invention and are not intended to be limiting thereof.

EXAMPLE 1

The following example exemplifies a particularly preferred embodiment of the invention wherein plastic and rubber materials are chemically bonded to form an outsole comprising mostly plastic materials with rubber material flex lines. Embodiments of such an outsole are illustrated in FIGS. 1-5.

A single mold was constructed into which preformed plastic components were placed leaving spaces for the rubber flex lines. Plastic material (polyphenylene ether) was placed (preform) into the mold.

Unvulcanized rubber was then added to mold and molded using a 200 Ton Rubber Press machine. The molded article was vulcanized at 320° F. for about 6 to about 8 minutes, and then was permitted to stand for about 4 minutes and cool. The outsole comprising both plastic and rubber materials was removed from the mold and subjected to conventional footwear manufacturing techniques to produce an article of footwear.

EXAMPLE 2

A standard SBR rubber comprising 100 parts by weight SBR, 50 parts by weight RAF N330 Carbon black, 3.0 parts by weight zinc oxide, 1.0 part by weight stearic acid, 1.75 parts by weight sulfur, 0.7 parts by weight MBS and 0.9 parts by weight TBBS was modified by adding 3.0 parts by weight TBBS and 6 parts by weight RICO-BOND® 1031 maleic anhydride resin. The SBR was modified by adding 3.25 parts per hundred rubber (PHR) TBBS and 8 PHR RICO-BOND® 1031 (maleic anhydride resin) to a two roll mill and mixing the reactants at ambient to about 185° F. for about 7 minutes or until a uniform dispersion is achieved. About 197 grams of modified SBR then was injected into a mold containing about 60 grams of a preformed TPU-ABS blend in a 200 Ton Rubber Press at about 320° F. for about 6 minutes, thereby permitting the formation of a chemical bond between the plastic and rubber material.

The material then was tested for pull strength—bond strength and compared to rubber joined to plastic using conventional adhesive techniques. The results demonstrate that the chemical bond formed in accordance with the present invention is superior to mechanical bonds of the prior art.

EXAMPLE 3

A first sample was prepared wherein a 99 mm×20 mm×3.25 mm bar of polyethylene plastic was cut from a sheet of polyethylene plastic material. A second sample was prepared wherein the same size bar of polyethylene was cut; however, a groove approximately 0.25 inches wide and 2 mm deep was cut in the center of the bar. A third bar having the same dimensions as the first and second samples was prepared wherein a thin strip of rubber material was placed between two polyethylene plastic sheets. These were then placed into a 200 Ton Rubber Press at about 320 to about 340° F. for about 4 to about 6 minutes in an ASTM tensile mold.

The three bars then were tested for resistance in kg to bending using a 3-point loading system. Each bar was supported from below (2 point support, 70 mm separation), then depressed in the center at 10 mm/min using a long bar crosshead thereby creating a 3-point load on each bar. The resistance was measured in $Kg/cm^3$ force. The results of the following test are graphically shown in FIG. 25.

Figure 25:
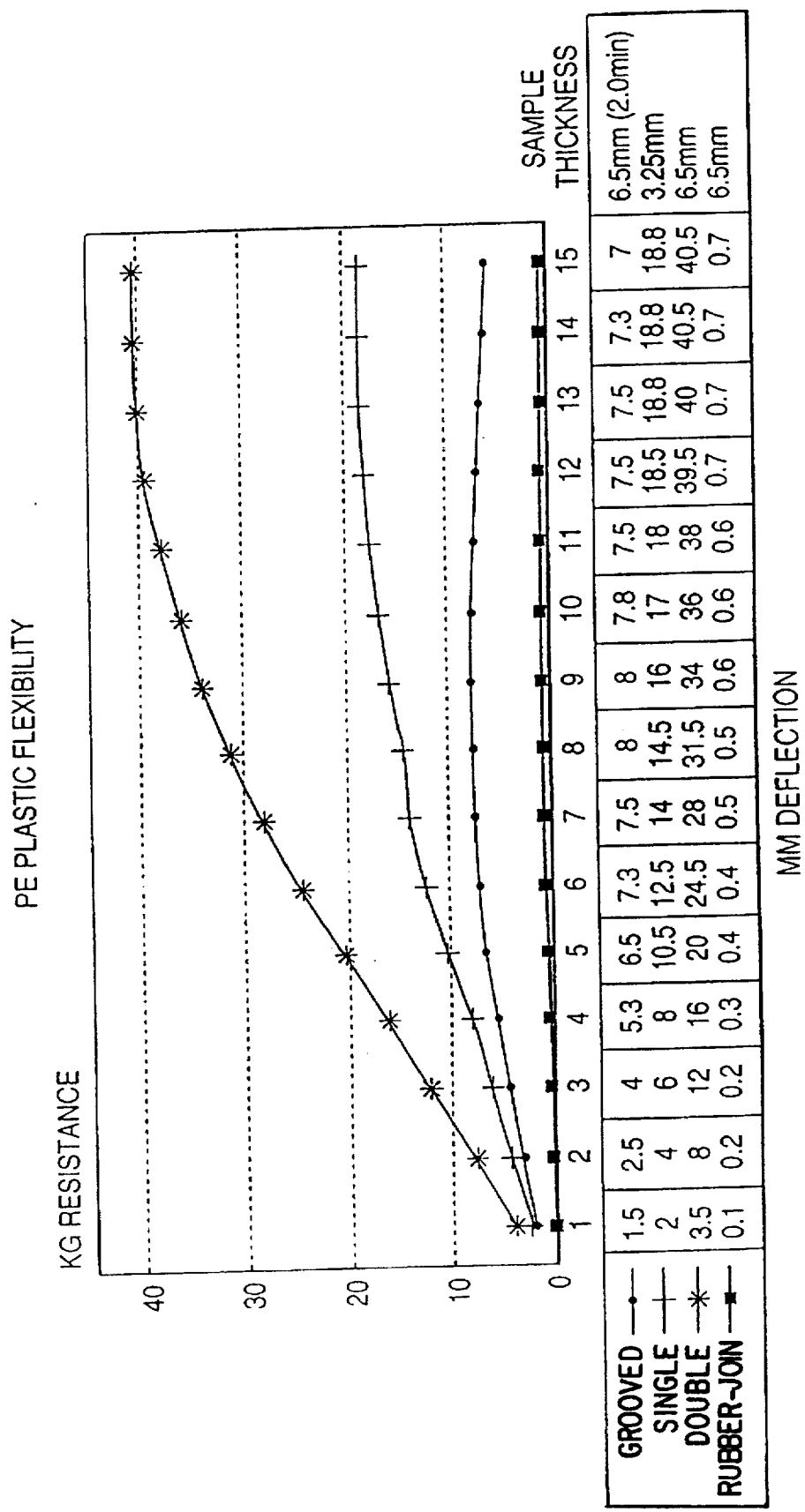
FIG. 25 is a graphical presentation of the results of Example 3 wherein the flexibility of a bar of plastic was compared to the flexibility of a notched bar of plastic and a bar of plastic to which has been chemically bonded some rubber material.

From FIG. 25, it can clearly be seen that the polyethylene bar which had a thin strip of rubber chemically bonded on both sides through its middle showed the least amount of resistance per mm of deflection. In fact, the rubber-joined plastic bars were about 50 times more flexible than the plain plastic bar, about 10 times more flexible than the notched plastic bar, and about 25 times more flexible than a half-thickness plain plastic bar.

Upon completion of the test, the notched bars retained a permanent crimp when the force was removed, and the plain plastic ban deformed slightly. The rubber-joined polyethylene bars, on the other hand, returned completely to their original shape. Accordingly, rubber-joined plastic materials would possess significant advantages in flexibility over uniform or notched outsoles.

Numerous modifications and variations of the present invention may be possible in light of the above teachings. It is therefore to be understood that within the scope of the appended claims, the invention may be practiced otherwise than as specifically described herein.

What is claimed is:

1. An article of footwear comprising an outsole having heel, medial, forefoot and lateral areas, said outsole being a bonded composite of relatively inelastic and relatively elastic materials wherein the relatively inelastic material comprises an outsole plate and the relatively elastic material comprises a plurality of substantially separate, independent segments underlying and chemically bonded to only a portion of said outsole plate, and at least one of said substantially separate, independent segments being positioned along at least a portion of an outer perimeter of the outsole.

2. The article of footwear according to claim 1 wherein the relatively elastic segments of the outsole are wedge-shaped and chemically bonded to desired void areas of the outsole plate for enhancing flexibility of the outsole along select lines of flexion.

3. The article of footwear according to claim 2 wherein at least one selected segment of relatively elastic material extends substantially across at least a portion of the outsole.

4. The article of footwear according to claim 1 wherein at least one segment of relatively elastic material extends substantially across at least a portion of the forefoot area of the outsole.

5. The article of footwear according to claim 1 wherein the relatively elastic segments are chemically bonded in at least two portions to medial and lateral areas of the outsole.

6. The article of footwear according to claim 1 wherein the relatively elastic segments of the outsole are arranged around the heel area of the outsole.

7. The article of footwear according to claim 6 wherein a further segment of relatively elastic material chemically bonded to the outsole plate fills a cavity of corresponding shape in the outsole plate, said cavity being centrally located in the heel area of the outsole.

8. The article of footwear according to claim 1 wherein the relatively elastic segments are arranged long the perimeter of the outsole in the heel, forefoot, medial and lateral areas of the outsole.

9. The article of footwear according to claim 8 wherein at least one segment of the relatively elastic material extends substantially across at least a portion of the outsole.

10. The article of footwear according to claim 9 wherein at least one segment extends substantially across at least a portion of the forefoot area of the outsole.

11. The article of footwear according to claim 1, wherein said segments of relatively elastic material comprise a rubber material selected from the group consisting of styrene butadiene rubber (SBR), natural rubbers (NR), styrene butadiene rubber/natural rubber (SBR/NR), ethylene propylene diene monomer/styrene butadiene (EPDM/SBR), carboxylated nitrile rubber (XNBR), polyisoprene rubber (IR), milliable urethane, polychloroporenes (neoprene), chlorosulfonated polyethylene, thermoplastic rubber, latex, and silicone rubber, and said relatively inelastic material comprises a plastic material selected from the group consisting of thermoplastic polyurethane, polyamide, polyethylene, nitrile, polyvinyl chloride, ethylene vinyl acetate, polyester, polycarbonate, polypropylene, polyphenylene ether, styrene, vinyl, polyether block amide, tetrafluoroethylene, fluoropolymers, thermoplastic polyester, chlorosulfonated polyethylene and polycarbonates.

12. The article of footwear according to claim 11, wherein said relatively elastic material is modified with a maleic compound selected from the group consisting of maleic acid, maleic anhydride, half alkyl ester of maleic acid, maleic amide and maleic imide.

13. The article of footwear according to claim 11, wherein said relatively inelastic material is modified with a functional moiety selected from the group consisting of an amine, a hydroxyl group, a thiol group, a carboxyl group, an isocyanide group, an epoxy group, an ether group, an aldehyde group, a borane group, a silicon group and groups derived therefrom such as a urethane group, an ester group, an amide group, an ammonium salt group and a metal carboxylate group.

14. The article of footwear according to claim 1, wherein said relatively inelastic material comprises a material selected from the group consisting of styrene butadiene rubber (SBR), natural rubbers (NR), styrene butadiene rubber/natural rubber (SBR/NR), ethylene propylene diene monomer/styrene butadiene (EPDM/SBR), carboxylated nitrile rubber (XNBR), polyisoprene rubber (IR), milliable urethane, polychloroporenes (neoprene), chlorosulfonated polyethylene, thermoplastic rubber, latex, and silicone rubber, and said relatively elastic material comprises a material selected from the group consisting of thermoplastic polyurethane, polyamide, polyethylene, nitrile, polyvinyl chloride, ethylene vinyl acetate, polyester, polycarbonate, polypropylene, polyphenylene ether, styrene, vinyl, polyether block amide, tetrafluoroethylene, fluoropolymers, thermoplastic polyester, chlorosulfonated polyethylene and polycarbonates.

15. The article of footwear according to claim 14, wherein said relatively inelastic material is modified with a maleic compound selected from the group consisting of maleic acid, maleic anhydride, half alkyl ester of maleic acid, maleic amide and maleic imide.

16. The article of footwear according to claim 14, wherein said relatively elastic material is modified with a functional moiety selected from the group consisting of an amine, a hydroxyl group, a thiol group, a carboxyl group, an isocyanide group, an epoxy group, an ether group, an aldehyde group, a borane group, a silicon group and groups derived therefrom such as a urethane group, an ester group, an amide group, an ammonium salt group and a metal carboxylate group.

17. The article of footwear according to claim 1, wherein said outsole plate comprises polyether block amide and said segments comprise carboxylated nitrile rubber (XNBR).

18. The article of footwear according to claim 8, wherein said outsole plate comprises polyether block amide and said segments comprise carboxylated nitrile rubber (XNBR).

19. The article of footwear according to claim 10, wherein said outsole plate comprises polyether block amide and said segments comprise carboxylated nitrile rubber (XNBR).

20. An article of footwear comprising an outsole defined by an outer perimeter and having heel, medial, and forefoot areas, said outsole comprising a polyether block amide outsole plate overlying and chemically bonded to a plurality of substantially separate, independent segments of carboxylated nitrile rubber (XNBR), said substantially separate, independent rubber segments being chemically bonded to only a portion of the outsole plate and arranged such that at least one segment extends substantially across at least a portion of the forefoot area of the outsole and at least two further segments, one on either side of the medial area of the outsole, extend from opposite portions of the outsole perimeter toward a central portion of the medial area, and such that at least one segment extends substantially along the perimeter of the outsole around the heel area.

* * * * *